United States Patent
Yamasaki et al.

(10) Patent No.: US 9,656,650 B2
(45) Date of Patent: May 23, 2017

(54) VEHICLE BRAKE DEVICE

(75) Inventors: Tsuyoshi Yamasaki, Toyota (JP); Masayasu Ohkubo, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 131 days.

(21) Appl. No.: 14/390,561

(22) PCT Filed: Apr. 5, 2012

(86) PCT No.: PCT/JP2012/059343
§ 371 (c)(1),
(2), (4) Date: Oct. 3, 2014

(87) PCT Pub. No.: WO2013/150631
PCT Pub. Date: Oct. 10, 2013

(65) Prior Publication Data
US 2015/0091370 A1  Apr. 2, 2015

(51) Int. Cl.
*B60T 8/88* (2006.01)
*B60T 13/68* (2006.01)
*B60T 7/04* (2006.01)
*B60T 13/14* (2006.01)
*B60T 13/66* (2006.01)
*B60T 8/40* (2006.01)
*B60T 13/74* (2006.01)

(52) U.S. Cl.
CPC ............ *B60T 13/686* (2013.01); *B60T 7/042* (2013.01); *B60T 8/4081* (2013.01); *B60T 8/88* (2013.01);
(Continued)

(58) Field of Classification Search
CPC . B60T 8/26; B60T 8/40; B60T 8/4081; B60T 8/88; B60T 8/92; B60T 8/94;
(Continued)

(56) References Cited

U.S. PATENT DOCUMENTS 8,152,244 B2 * 4/2012 Yanai .................. B60T 1/10
303/116.2
8,167,383 B2 * 5/2012 Nishino .............. B60T 7/042
188/355

(Continued)

FOREIGN PATENT DOCUMENTS

JP   2006-35981    2/2006
JP   2006-123889   5/2006
(Continued)

OTHER PUBLICATIONS

International Search Report issued Jul. 10, 2012, in PCT/JP12/59343 filed Apr. 5, 2012.

*Primary Examiner* — Melody Burch
(74) *Attorney, Agent, or Firm* — Oblon, McClelland, Maier & Neustadt, L.L.P.

(57) ABSTRACT

A brake ECU brings master cut valves into an open state and brings holding valves into a closed state, thereby controlling a master cylinder and wheel cylinders to communicate to each other when a magnitude of a hydraulic pressure detected by an accumulator pressure sensor has decreased to a value less than a predetermined value set in advance. On the other hand, the ECU maintains holding valves in an open state, and controls an accumulator and the wheel cylinders to communicate to each other via linear control valves. Then, the ECU determines in which brake system a failure occurs out of a brake system for a front right wheel, a brake system for a front left wheel, and brake systems for rear right and left wheels based on changes in hydraulic pressure detected by a sensor, a master cylinder pressure sensor, and a control pressure sensor.

22 Claims, 13 Drawing Sheets

(52) U.S. Cl.
CPC .......... *B60T 13/142* (2013.01); *B60T 13/146* (2013.01); *B60T 13/662* (2013.01)

(58) Field of Classification Search
CPC .. B60T 13/147; B60T 13/161; B60T 2270/40; B60T 13/142; B60T 13/146; B60T 13/662; B60T 13/686; B60T 13/74; B60T 7/042
USPC ............................... 303/122, 122.03, 122.09
See application file for complete search history.

(56) References Cited

U.S. PATENT DOCUMENTS

| | | | |
|---|---|---|---|
| 2006/0066146 A1 | 3/2006 | Otomo | |
| 2007/0108837 A1* | 5/2007 | Ohkubo | B60T 8/4081 303/122.08 |
| 2007/0176486 A1 | 8/2007 | Nakamura | |
| 2009/0302675 A1 | 12/2009 | Nakaoka et al. | |
| 2009/0315391 A1* | 12/2009 | Tanaka | B60T 8/3655 303/113.5 |
| 2011/0316326 A1* | 12/2011 | Miyazaki | B60T 8/885 303/2 |

FOREIGN PATENT DOCUMENTS

| | | |
|---|---|---|
| JP | 2007-203859 | 8/2007 |
| JP | 2009-61816 | 3/2009 |
| JP | 2009-166755 | 7/2009 |
| JP | 2009-262836 | 11/2009 |
| JP | 2011-156998 | 8/2011 |
| JP | 2011-156999 | 8/2011 |
| JP | 2011-157000 | 8/2011 |

* cited by examiner

VEHICLE BRAKE DEVICE

TECHNICAL FIELD

The present invention relates to a vehicle brake device including a pressurizing pump and a linear control valve, and being configured to set a target hydraulic pressure for wheel cylinders corresponding to a hydraulic pressure that is generated in a master cylinder in response to a stepping operation by a driver on a brake pedal, and drive the linear control valve, thereby supplying the hydraulic pressure increased by the pressurizing pump so that the hydraulic pressure follows the set target hydraulic pressure for the wheel cylinders.

BACKGROUND ART

Hitherto, as the vehicle brake device of this type, a brake control device disclosed in, for example, Patent Literature 1 has been known. In the related-art brake control device, in a state where a pressure increasing linear control valve and a pressure decreasing linear control valve are driven to supply a hydraulic pressure increased by a pressurizing pump so that the hydraulic pressure follows a set target hydraulic pressure for wheel cylinders, if an abnormality such as a leak of a working fluid occurs at any location, the supply of control currents to all electromagnetic control valves is stopped, thereby transmitting a hydraulic pressure generated in the master cylinder to wheel cylinders for front right and left wheels, and transmitting an accumulated hydraulic pressure to wheel cylinders for rear right and left wheels.

Moreover, hitherto, as the brake device of this type, brake systems disclosed in, for example, Patent Literatures 2 and 3 have also been known. In the related-art brake systems, if an abnormality occurs in an electric system, operations of a pressurizing pump, a pressure increasing linear control valve, and a pressure decreasing linear control valve are stopped. Then, a pressure increasing mechanism is operated by a hydraulic pressure in a master cylinder, and a servo pressure is supplied to brake cylinders of front right and left wheels or front and rear brake cylinders at positions diagonal to each other. If a working fluid may be leaking, the operations of the pressurizing pump, the pressure increasing linear control valve, and the pressure decreasing linear control valve are stopped, and an operation of the pressure increasing mechanism is also stopped. In this manner, communication between the front right and left wheels is shut off, and communication between the front and rear wheels is shut off.

CITATION LIST

Patent Literature

[PTL 1] JP 2009-61816 A
[PTL 2] JP 2011-156998 A
[PTL 3] JP 2011-156999 A

SUMMARY OF INVENTION

By the way, in the related-art brake control device and brake systems, if the working fluid leaks or if the working fluid may be leaking, in other words, if such a failure (abnormality) that the hydraulic pressure of the working fluid cannot be transmitted through a brake system for transmitting the hydraulic pressure of the working fluid to the wheel cylinder occurs, at least the operations of the pressure increasing linear control valve and the pressure decreasing linear control valve are stopped, and thereafter the communication between the front wheel side and the rear wheel side is shut off, and the communication between the front right wheel and the front left wheel is shut off. On this occasion, in the related-art brake control device and brake systems, the operations of the pressure increasing linear control valve and the pressure decreasing linear control valve are immediately stopped to shut off the communication between the front wheel side and the rear wheel side and the communication between the front right wheel and the front left wheel without identifying the brake system in which such a failure that the working fluid is leaking has occurred. As a result, in the related-art brake control device and brake systems, even if the working fluid is leaking from any one of the brake systems, the other brake system is not influenced.

However, the normal brake system without any failure may not be efficiently used in the related-art brake control device and brake systems which are not configured to identify the failed brake system. In this case, in the related-art brake control device and brake systems, for example, sensors for detecting the leak of the working fluid are provided in the respective brake systems, thereby being capable of identifying the brake system in which the working fluid is leaking. However, in this case, an increase in cost caused by the provision of the sensors is concerned.

The present invention has been devised in order to solve the above-mentioned problem, and has an object to provide a vehicle brake device capable of identifying a brake system failed in transmitting a hydraulic pressure of a working fluid by using an inexpensive configuration and capable of generating an appropriate braking force by using other brake systems.

In order to achieve the object, a vehicle brake device according to one embodiment of the present invention includes a wheel cylinder, a master cylinder, a power hydraulic pressure source, a linear control valve, first hydraulic pressure detection means, second hydraulic pressure detection means, third hydraulic pressure detection means, and control means.

The wheel cylinder is configured to receive a hydraulic pressure of a working fluid and apply a braking force to a wheel. The master cylinder is configured to introduce therein a servo pressure generated in response to an operation by a driver on a brake pedal, thereby generating a hydraulic pressure. The power hydraulic pressure source is configured to generate a hydraulic pressure by drive of a pressurizing pump. The linear control valve is configured to adjust the hydraulic pressure transmitted from the power hydraulic pressure source to the wheel cylinder. The first hydraulic pressure detection means is configured to detect the hydraulic pressure output from the power hydraulic pressure source. The second hydraulic pressure detection means is configured to detect the hydraulic pressure output from the master cylinder. The third hydraulic pressure detection means is configured to detect the hydraulic pressure in the wheel cylinder. The control means is configured to control drive of the linear control valve based on the hydraulic pressure output from the master cylinder and detected by the second hydraulic pressure detection means, and the hydraulic pressure in the wheel cylinder detected by the third hydraulic pressure detection means.

One feature of the vehicle brake device according to one embodiment of the present invention resides in that: the control means is configured to: shut off, when a magnitude of the hydraulic pressure output from the power hydraulic pressure source and detected by the first hydraulic pressure detection means has decreased to a value less than a predetermined value set in advance, communication between the wheel cylinders provided on a front wheel side of a vehicle and the wheel cylinders provided on a rear wheel side of the vehicle, switch the respective wheel cylinders provided for front right and left wheels of the vehicle to a communication state where the wheel cylinders communicate to the master cylinder independently from each other, and switch the wheel cylinders provided for rear right and left wheels of the vehicle to a communication state where the wheel cylinders communicate via the linear control valve to the power hydraulic pressure source; and determine, based on at least one of changes in hydraulic pressures detected by the first hydraulic pressure detection means, the second hydraulic pressure detection means, and the third hydraulic pressure detection means after the communication state is switched, in which brake system such a failure that the hydraulic pressure of the working fluid is unable to be transmitted occurs out of a brake system for the front right wheel for providing communication between the master cylinder and the wheel cylinder on the front right wheel, a brake system for the front left wheel for providing communication between the master cylinder and the wheel cylinder on the front left wheel, and brake systems for the rear right and left wheels for providing communication between the power hydraulic pressure source and the wheel cylinders on the rear right and left wheels.

Note that, in this case, the control means may include: hydraulic pressure determination means for determining whether or not the magnitude of the hydraulic pressure output from the power hydraulic pressure source and detected by the first hydraulic pressure detection means has decreased to a value less than the predetermined value set in advance; communication state switching means for shutting off, when the hydraulic pressure determination means determines that the magnitude of the hydraulic pressure output from the power hydraulic pressure source has decreased to a value less than the predetermined value set in advance, the communication between the wheel cylinders provided on the front wheel side of the vehicle and the wheel cylinders provided on the rear wheel side of the vehicle, switching the respective wheel cylinders provided for the front right and left wheels of the vehicle to the communication state where the wheel cylinders provided for the front right and left wheels communicate to the master cylinder independently of each other, and switching the wheel cylinders provided for the rear right and left wheels of the vehicle to the communication state where the wheel cylinders communicate via the linear control valve to the power hydraulic pressure source; and failure determination means for determining, based on at least one of the changes in hydraulic pressures detected by the first hydraulic pressure detection means, the second hydraulic pressure detection means, and the third hydraulic pressure detection means after the communication state is switched by the communication state switching means, in which brake system the failure that the hydraulic pressure of the working fluid is unable to be transmitted occurs out of the brake system for the front right wheel for providing the communication between the master cylinder and the wheel cylinder on the front right wheel, the brake system for the front left wheel for providing the communication between the master cylinder and the wheel cylinder on the front left wheel, and the brake systems for the rear right and left wheels for providing the communication between the power hydraulic pressure source and the wheel cylinders on the rear right and left wheels.

Further, in this case, more specifically, the control means may determine, based on a change in hydraulic pressure continuing to decrease without turning to increase and recovering after the communication state is switched out of the changes in hydraulic pressures detected by the first hydraulic pressure detection means, the second hydraulic pressure detection means, and the third hydraulic pressure detection means, in which brake system the failure occurs out of the brake system for the front right wheel, the brake system for the front left wheel, and the brake systems for the rear right and left wheels.

Further, in this case, the servo pressure to be introduced into the master cylinder may be supplied from, for example, a pressure increasing mechanism that is configured to mechanically move by the hydraulic pressure output from the master cylinder in response to the operation by the driver on the brake pedal, to thereby generate a hydraulic pressure having a predetermined ratio with respect to the hydraulic pressure output from the master cylinder. Further, in this case, in the master cylinder, for example, a piston rod for coupling a pressurizing piston for pressurizing the stored working fluid and the brake pedal to each other may be divided, and the piston rod may include: a first piston rod connected to the brake pedal at one end; a second piston rod connected to the pressurizing piston at one end; and an elastic body for coupling another end of the first piston rod and another end of the second piston rod to each other, and adjusting a stroke caused by the operation by the driver on the brake pedal. The servo pressure may be introduced from the pressure increasing mechanism to at least the pressurizing piston and the another end of the first piston rod.

With those configurations, a sensor (specifically, an accumulator pressure sensor) corresponding to the first hydraulic pressure detection means, a sensor (specifically, a master cylinder pressure sensor) corresponding to the second hydraulic pressure detection means, and a sensor (specifically, a control pressure sensor) corresponding to the third hydraulic pressure detection means among various sensors hitherto installed on the vehicle brake device can be used to appropriately determine whether or not a failure (abnormality) occurs in any one of the brake system for the front right wheel, the brake system for the front left wheel, and the brake systems for the rear right and left wheels. Thus, the brake system in which the failure occurs can be determined (identified) by using an inexpensive configuration without any increase in cost. Because the brake system in which the failure occurs can be determined (identified) in this way, the other brake systems in which no failure occurs can be efficiently utilized to transmit the hydraulic pressure to the wheel cylinders, thereby generating appropriate braking forces on the wheels. As a result, the driver can sense appropriate brake feeling without generating a useless change in behavior on the vehicle.

In this case, more specifically, the second hydraulic pressure detection means may communicate to the brake system for the front right wheel or the brake system for the front left wheel, and the control means may determine, after the communication state is switched, when at least the hydraulic pressures detected by the first hydraulic pressure detection means and the second hydraulic pressure detection means turn to increase and recover, that the failure occurs in the brake system not communicating to the second hydraulic pressure detection means out of the brake systems for the front right wheel and the front left wheel. As a result, the control means may be configured to: maintain, when the control means determines that the failure occurs in the brake system not communicating to the second hydraulic pressure detection means out of the brake systems for the front right wheel and the front left wheel, the communication between the master cylinder and the wheel cylinder in the brake system communicating to the second hydraulic pressure detection means, and shut off the communication between the master cylinder and the wheel cylinder in the brake system not communicating to the second hydraulic pressure detection means; and maintain the communication between the wheel cylinder and the power hydraulic pressure source via the linear control valve in the brake system on a diagonal position side with respect to the brake system communicating to the second hydraulic pressure detection means out of the brake systems for the rear right and left wheels, and shut off the communication between the wheel cylinder and the power hydraulic pressure source via the linear control valve in the brake system on another side.

Further, the second hydraulic pressure detection means may communicate to the brake system for the front right wheel or the brake system for the front left wheel; and the control means may determine, after the communication state is switched, when at least the hydraulic pressure detected by the first hydraulic pressure detection means turns to increase and recovers while the hydraulic pressure detected by the second hydraulic pressure detection means continues to decrease without turning to increase and recovering, that the failure occurs in the brake system communicating to the second hydraulic pressure detection means out of the brake systems for the front right and left wheels. As a result, the control means may be configured to: maintain, when the control means determines that the failure occurs in the brake system communicating to the second hydraulic pressure detection means out of the brake systems for the front right wheel and the front left wheel, the communication between the master cylinder and the wheel cylinder in the brake system not communicating to the second hydraulic pressure detection means, and shut off the communication between the master cylinder and the wheel cylinder in the brake system communicating to the second hydraulic pressure detection means; and maintain the communication between the wheel cylinder and the power hydraulic pressure source via the linear control valve in the brake system on a diagonal position with respect to the brake system not communicating to the second hydraulic pressure detection means out of the brake systems for the rear right and left wheels, and shut off the communication between the wheel cylinder and the power hydraulic pressure source via the linear control valve in the brake system on another side.

With those configurations, when it is determined that a failure has occurred in one of the brake system for the front right wheel and the brake system for the front left wheel, the supply of the working fluid via the failed brake system from the master cylinder to the wheel cylinder is shut off, while the supply of the working fluid via the brake system not failed from the master cylinder to the wheel cylinder is maintained. Thus, generation of a braking force can be maintained for the wheel corresponding to the brake system without a failure. Moreover, when it is determined that a failure has occurred in one of the brake systems for the front right wheel and the front left wheel, a hydraulic pressure adjusted by the linear control valve can be supplied from the power hydraulic pressure source to a brake system at a diagonal position with respect to the brake system where it is determined that no failure has occurred on the front wheel side out of the brake systems for the rear right and left wheels.

In other words, the working fluid is supplied from the master cylinder to the brake system where no failure has occurred on the front wheel side, and hence the hydraulic pressure generated by the master cylinder can be transmitted to the wheel cylinder to generate a braking force on the wheel on the front wheel side, whereas the working fluid is supplied from the power hydraulic pressure source to the brake system on the rear wheel side at the diagonal position, and hence the hydraulic pressure adjusted by the linear control valve can be transmitted to the wheel cylinder to generate a braking force on the wheel on the rear wheel side. As a result, the brake systems where no failure has occurred can be efficiently used to generate the braking forces on the wheels at the positions diagonal to each other, and a useless change in behavior is thus not generated on the vehicle.

In addition, the control means may determine, after the communication state is switched, when at least the hydraulic pressure detected by the first hydraulic pressure detection means continues to decrease without turning to increase and recovering while the hydraulic pressure detected by the second hydraulic pressure detection means turns to increase and recovers, that the failure occurs in the brake systems for the rear right and left wheels. As a result, the control means may be configured to: shut off, when the control means determines that the failure occurs in the brake systems for the rear right and left wheels, the communication between the power hydraulic pressure source and the respective wheel cylinders in the brake systems for the rear right and left wheels; and maintain the communication between the master cylinder and the wheel cylinder in the brake system for the front right wheel, and the communication between the master cylinder and the wheel cylinder in the brake system for the front left wheel.

With those configurations, when it is determined that a failure has occurred in the brake systems for the rear right and left wheels, the supply of the working fluid is shut off from the power hydraulic pressure source via the brake systems for the rear right and left wheels to the wheel cylinders, while the supply of the working fluid is maintained via the brake systems for the front right and left wheels where no failure has occurred from the master cylinder to the wheel cylinders. Thus, generation of braking forces can be maintained for the front right and left wheels corresponding to the brake systems for the front right and left wheels where no failure has occurred. As a result, the brake systems where no failure has occurred can be efficiently used to appropriately generate the braking forces on the front right and left wheels, and a useless change in behavior is thus not generated on the vehicle.

Further, another feature of the vehicle brake device according to one embodiment of the present invention resides in that: the vehicle brake device further includes stroke detection means for detecting a stroke input to the master cylinder in response to the operation by the driver on the brake pedal; and the control means determines, based on at least one of the changes in hydraulic pressures detected by the first hydraulic pressure detection means, the second hydraulic pressure detection means, and the third hydraulic pressure detection means after the communication state is switched, and a change in stroke detected by the stroke detection means, in which brake system the failure occurs out of the brake system for the front right wheel, the brake system for the front left wheel, and the brake systems for the rear right and left wheels.

In this case, more specifically, the control means may determine, after the communication state is switched, when the change in stroke detected by the stroke detection means is a change which continues to increase to a mechanically restricted stroke, that the failure occurs in at least one of the brake system for the front right wheel or the brake system for the front left wheel. Further, in this case, more specifically, the control means may determine, after the communication state is switched, when the stroke detected by the stroke detection means is maintained constant, that the failure occurs in the brake systems for the rear right and left wheels.

Also with those configurations, whether or not a failure (abnormality) occurs in any one of the brake systems for the front right wheel, the front left wheel, and the rear right and left wheels can be appropriately determined by using a sensor (specifically, a stroke sensor) corresponding to the stroke detection means among various sensors hitherto installed on the vehicle brake device. Thus, the brake system in which the failure occurs can be determined (identified) by using an inexpensive configuration without an increase in cost. Also in this case, because the brake system in which the failure occurs can be determined (identified), the other brake systems in which no failure occurs can be efficiently utilized to transmit the hydraulic pressure to the wheel cylinders, thereby generating appropriate braking forces on the wheels. As a result, the driver can sense appropriate brake feeling without generating a useless change in behavior on the vehicle.

DESCRIPTION OF EMBODIMENT

Figure 1:
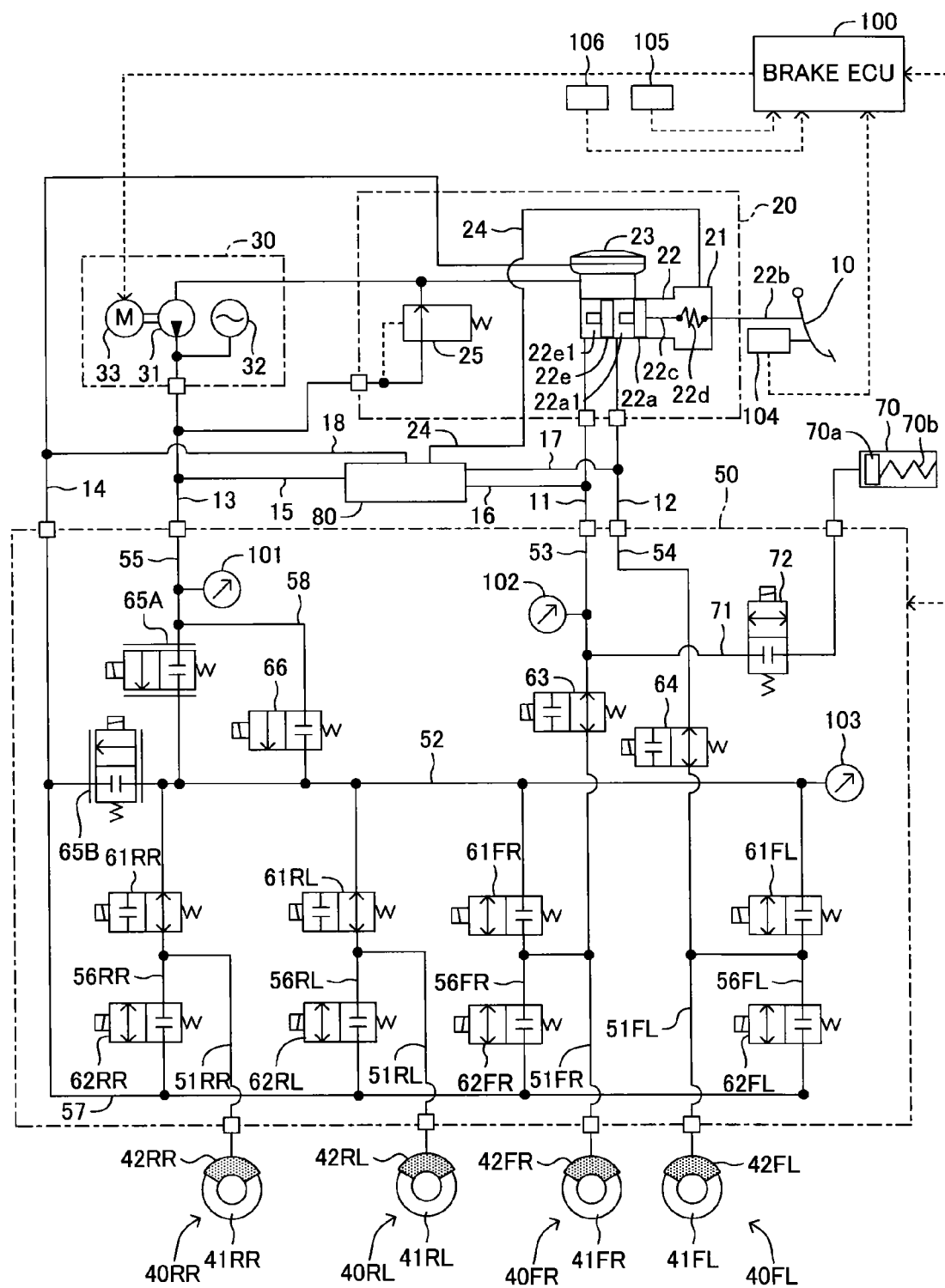
FIG. 1 is a schematic system diagram of a vehicle brake device according to an embodiment of the present invention.

Now, a vehicle brake device according to an embodiment of the present invention is described referring to the drawings. FIG. 1 is a schematic system diagram of the vehicle brake device according to this embodiment.

The brake device according to this embodiment includes a brake pedal 10, a master cylinder unit 20, a power hydraulic pressure generation device 30, a hydraulic pressure control valve device 50, a pressure increasing mechanism 80, and a brake ECU 100 for brake control. Brake units 40FR, 40FL, 40RR, and 40RL installed on respective wheels include brake rotors 41FR, 41FL, 41RR, and 41RL, and wheel cylinders 42FR, 42FL, 42RR, and 42RL integrated into brake calipers. The brake units 40 are not limited to the case where disk brakes are installed on all the four wheels, and, for example, drum brakes may be installed on all the four wheels, or the disk brakes and the drum brakes may be arbitrarily combined in such a way that the disk brakes are installed on the front wheels and the drum brakes are installed on the rear wheels. In the following description, configurations provided for the respective wheels are denoted by suffixes FR for the front right wheel, FL for the front left wheel, RR for the rear right wheel, and RL for the rear left wheel, but if the specification of the wheel position is not particularly necessary, the suffix is omitted.

The wheel cylinders 42FR, 42FL, 42RR, and 42RL are connected to the hydraulic pressure control valve device 50, and receive transmitted hydraulic pressures of the working fluid (brake fluid) supplied from the hydraulic pressure control valve device 50. Then, brake pads are pressed against the brake rotors 41FR, 41FL, 41RR, and 41RL rotating along with the wheels by the hydraulic pressure supplied from the hydraulic pressure control valve device 50, thereby applying braking forces to the wheels.

The master cylinder unit 20 includes a hydraulic pressure booster 21, a master cylinder 22, a reservoir 23, and a servo pressure pipe 24. The hydraulic pressure booster 21 is coupled to the brake pedal 10, and amplifies a pedal stepping force F (hereinafter simply referred to as "stepping force F") applied by the driver to the brake pedal 10. In other words, the hydraulic pressure booster 21 amplifies the stepping force F by being supplied with the working fluid (more specifically, a servo pressure Ps) via the servo pressure pipe 24 from the pressure increasing mechanism 80 for increasing the pressure of the working fluid by a mechanical operation as described later.

The master cylinder 22 according to this embodiment includes a pressurizing piston 22a, a first piston rod 22b coupled to the brake pedal 10, and a second piston rod 22c coupled to the pressurizing piston 22a. Then, the master cylinder 22 includes a stroke adjustment spring 22d arranged between the first piston rod 22b and the second piston rod 22c to couple the rods 22b and 22c to each other, for serving as an elastic body for adjusting a stroke caused by the stepping operation on the brake pedal 10. Moreover, the master cylinder 22 according to this embodiment is a tandem type including a pressurizing piston 22e as well as the pressurizing piston 22a, and the pressurizing pistons 22a and 22e are configured to stroke in response to the stepping force F input by the stepping operation on the brake pedal 10 via the first piston rod 22b, the stroke adjustment spring 22d, and the second piston rod 22*c*, thereby each generating a master cylinder pressure Pmc having a predetermined boost ratio.

The reservoir 23 for storing the working fluid is provided at a top of the master cylinder 22. In the master cylinder 22, when the stepping operation on the brake pedal 10 is released, and the pressurizing pistons 22*a* and 22*e* are retracted, pressurizing chambers 22*a*1 and 22*e*1 formed by the pressurizing pistons 22*a* and 22*e* communicate to the reservoir 23.

The power hydraulic pressure generation device 30 is a power hydraulic pressure source, and includes a pressurizing pump 31 and an accumulator 32. The pressurizing pump 31 has an inlet opening connected to the reservoir 23 and an outlet opening connected to the accumulator 32, and drives the motor 33 to pressurize the working fluid. The accumulator 32 converts pressure energy of the working fluid pressurized by the pressurizing pump 31 into pressure energy of a filler gas such as nitrogen, thereby accumulating the pressure energy. Moreover, the accumulator 32 is connected to a relief valve 25 provided to the master cylinder unit 20. The relief valve 25 opens when the pressure of the working fluid increases to a predetermined pressure or more, thereby returning the working fluid to the reservoir 23.

In this way, the brake device includes, as the hydraulic pressure source for applying a hydraulic pressure of the working fluid to the wheel cylinders 42, the master cylinder 22 for applying the hydraulic pressure by using the stepping force F input by the driver via the brake pedal 10, and the power hydraulic pressure generation device 30 for applying the hydraulic pressure independently of the master cylinder 22. Then, in the brake device, the master cylinder 22 and the power hydraulic pressure generation device 30 are connected respectively via master pressure pipes 11 and 12 and an accumulator pressure pipe 13 to the hydraulic pressure control valve device 50. Moreover, the reservoir 23 is connected via a reservoir pipe 14 to the hydraulic pressure control valve device 50.

The hydraulic pressure control valve device 50 includes four individual flow passages 51FR, 51FL, 51RR, and 51RL connected to the respective wheel cylinders 42FR, 42FL, 42RR, and 42RL, a main flow passage 52 for communicating to the individual flow passages 51FR, 51FL, 51RR, and 51RL, master pressure flow passages 53 and 54 for connecting the individual flow passages 51FR and 51FL and the master pressure pipes 11 and 12, respectively, to each other, and an accumulator pressure flow passage 55 for connecting the main flow passage 52 and the accumulator pressure pipe 13 to each other. The master pressure flow passages 53 and 54 and the accumulator pressure flow passage 55 are connected in parallel with one another to the main flow passage 52.

Holding valves 61FR, 61FL, 61RR, and 61RL are respectively provided on the individual flow passages 51FR, 51FL, 51RR, and 51RL. According to this embodiment, the holding valves 61FR and 61FL respectively provided on the brake unit 40FR for the front right wheel and on the brake unit 40FL for the front left wheel are electromagnetic normally-closed on-off valves which are each configured to maintain a closed state by a biasing force of a spring in a non-current supply state of a solenoid, and be brought into an open state only in a current supply state of the solenoid. The holding valves 61RR and 61RL respectively provided on the brake unit 40RR for the rear right wheel and on the brake unit 40RL for the rear left wheel are electromagnetic normally-open on-off valves which are each configured to maintain an open state by a biasing force of a spring in a non-current supply state of a solenoid, and be brought into a closed state only in a current supply state of the solenoid.

As a result, in the holding valves 61FR and 61FL respectively provided on the right and left brake units 40FR and 40FL on the front wheel side, and the holding valves 61RR and 61RL respectively provided on the right and left brake units 40RR and 40RL on the rear wheel side, the holding valves on the front wheel side are the normally-closed electromagnetic on-off valves, and the holding valves on the rear wheel side are the normally-open electromagnetic on-off valves. As a result, when the holding valves 61FR and 61FL, which are the normally-closed electromagnetic on-off valves, are in the open state by the current supply to the solenoids on the right and left brake units 40FR and 40FL on the front wheel side, the main flow passage 52 and the wheel cylinders 42FR and 42FL communicate to each other. Moreover, when the holding valves 61RR and 61RL, which are the normally-open electromagnetic on-off valves, are in the closed state by the current supply to the solenoids on the right and left brake units 40RR and 40RL on the rear wheel side, the communication of the main flow passage 52 and the wheel cylinders 42RR and 42RL is shut off.

Moreover, pressure decreasing individual flow passages 56FR, 56FL, 56RR, and 56RL are respectively connected to the individual flow passages 51FR, 51FL, 51RR, and 51RL. The respective pressure decreasing individual flow passages 56 are connected to a reservoir flow passage 57. The reservoir flow passage 57 is connected via the reservoir pipe 14 to the reservoir 23. Pressure decreasing valves 62FR, 62FL, 62RR, and 62RL are respectively provided at intermediate portions of the pressure decreasing individual flow passages 56FR, 56FL, 56RR, and 56RL. The respective pressure decreasing valves 62 are normally-closed electromagnetic on-off valves which are each configured to maintain a closed state by a biasing force of a spring in a non-current supply state of a solenoid, and be brought into an open state only in a current supply state of the solenoid. In the open state, each pressure decreasing valve 62 causes the working fluid to flow from the wheel cylinder 42 via the pressure decreasing individual flow passage 56 to the reservoir flow passage 57, thereby decreasing a wheel cylinder pressure (corresponding to a control pressure Px described later).

Master cut valves 63 and 64 are respectively provided at intermediate portions of the master pressure flow passages 53 and 54. The respective master cut valves 63 and 64 are normally-open electromagnetic on-off valves which are each configured to maintain an open state by a biasing force of a spring in a non-current supply state of a solenoid, and be brought into a closed state only in a current supply state of the solenoid. By providing the master cut valves 63 and 64 as described above, when the master cut valves 63 and 64 are in the closed state, the communication of the working fluid is shut off between the master cylinder 22 and the individual flow passages 51FR and 51FL, and when the master cut valves 63 and 64 are in the open state, the communication of the working fluid is permitted between the master cylinder 22 and the individual flow passages 51FR and 51FL.

Moreover, according to this embodiment, a simulator flow passage 71 is provided to the master pressure flow passage 53 so as to branch on an upstream side (master cylinder 22 side) with respect to the master cut valve 63. In this case, it should be understood that the present invention can also be carried out so that the simulator flow passage 71 is provided to the master pressure flow passage 54 on an upstream side with respect to the master cut valve 64. A stroke simulator 70 is connected via a simulator cut valve 72 to the simulator flow passage 71. The simulator cut valve 72 is a normally-closed electromagnetic on-off valve which is configured to maintain a closed state by a biasing force of a spring in a non-current supply state of a solenoid, and be brought into an open state only in a current supply state of the solenoid. As a result, when the simulator cut valve 72 is in the closed state, the communication of the working fluid is shut off between the master pressure flow passage 53 (or the master pressure flow passage 54) and the stroke simulator 70, and when the simulator cut valve 72 is in the open state, the communication of the working fluid is permitted between the master pressure flow passage 53 (or the master pressure flow passage 54) and the stroke simulator 70.

The stroke simulator 70 includes a piston 70a and a spring 70b, and introduces the working fluid in an amount corresponding to a brake operation amount (corresponding to a stroke Sm described later) on the brake pedal 10 by the driver into the inside thereof when the simulator cut valve 72 is in the open state. Then, the stroke simulator 70 displaces the piston 70a against the biasing force of the spring 70b in synchronous with the introduction of the working fluid (namely, the master cylinder pressure Pmc) into the inside, thereby enabling a stroke operation of the brake pedal 10 by the driver, and generating a reaction force corresponding to the brake operation amount to provide appropriate brake operation feeling to the driver.

A pressure increasing linear control valve 65A is provided at an intermediate portion of the accumulator pressure flow passage 55. Moreover, a pressure decreasing linear control valve 65B is provided between a connected point of the accumulator pressure flow passage 55 to the main flow passage 52 and the reservoir flow passage 57. The pressure increasing linear control valve 65A and the pressure decreasing linear control valve 65B are normally-closed electromagnetic linear control valves which are each configured to maintain a closed state by a biasing force of a spring in a non-current supply state of a solenoid, and increase a valve opening degree along with an increase in current supply amount (current value) to the solenoid. A detailed description is not given of the pressure increasing linear control valve 65A and the pressure decreasing linear control valve 65B, but each of the pressure increasing linear control valve 65A and the pressure decreasing linear control valve 65B maintains the closed state by a valve closing force represented by a difference between a spring force of biasing a valve body toward a valve closing direction by the built-in spring and a pressure difference force of biasing the valve body toward a valve opening direction by a pressure difference between a primary side (inlet side) through which the working fluid relatively high in pressure communicates and a secondary side (outlet side) through which the working fluid relatively low in pressure communicates.

On the other hand, each of the pressure increasing linear control valve 65A and the pressure decreasing linear control valve 65B opens at an opening degree corresponding to a balance between the forces acting on the valve body if an electromagnetic attraction force generated by the current supply to the solenoid and acting toward the direction to open the valve body exceeds the valve closing force, in other words, if a relationship of "electromagnetic attraction force>valve closing force (=spring force-pressure difference force)" holds true. Thus, by controlling the current supply amount (current value) to the solenoid, each of the pressure increasing linear control valve 65A and the pressure decreasing linear control valve 65B can adjust the opening degree corresponding to the pressure difference force, namely, the pressure difference between the primary side (inlet side) and the secondary side (outlet side). On this occasion, the pressure increasing linear control valve 65A and the pressure decreasing linear control valve 65B correspond to linear control valves according to the present invention. In the following description, if the pressure increasing linear control valve 65A and the pressure decreasing linear control valve 65B do not need to be distinguished from each other, they are also simply referred to as linear control valve 65.

Moreover, a branch flow passage 58 is provided to the accumulator pressure flow passage 55 at a location closer to the accumulator 32 than the pressure increasing linear control valve 65A in order to secure a volume (flow rate) of the working fluid supplied to the respective wheel cylinders 42. The branch flow passage 58 is connected via an adjusted flow rate cut valve 66 to the main flow passage 52. The adjusted flow rate cut valve 66 is a normally-closed electromagnetic on-off valve which is configured to maintain a closed state by a biasing force of a spring in a non-current supply state of a solenoid, and be brought into an open state only in a current supply state of the solenoid. As a result, when the adjusted flow rate cut valve 66 is in the closed state, the communication of the working fluid via the branch flow passage 58 is shut off, and the working fluid (namely, an adjusted accumulator pressure Pacc described later) is supplied only via the pressure increasing linear control valve 65A from the accumulator 32 to the main flow passage 52. Moreover, when the adjusted flow rate cut valve 66 is in the open state, the working fluid (namely, the accumulator pressure Pacc) is supplied via the branch flow passage 58 from the accumulator 32 to the main flow passage 52 in addition to the working fluid (namely, the adjusted accumulator pressure Pacc) supplied via the pressure increasing linear control valve 65A from the accumulator 32 to the main flow passage 52.

Moreover, the pressure increasing mechanism 80 for supplying the hydraulic pressure booster 21 of the master cylinder unit 20 with the servo pressure Ps is provided in the brake device in order to reduce a load during the stepping operation by the driver on the brake pedal 10. A description is now given of the pressure increasing mechanism 80 according to this embodiment. Note that, as the pressure increasing mechanism 80, any structure capable of always supplying the hydraulic pressure booster 21 with the servo pressure Ps by a mechanical operation as described later can be employed.

Figure 2:
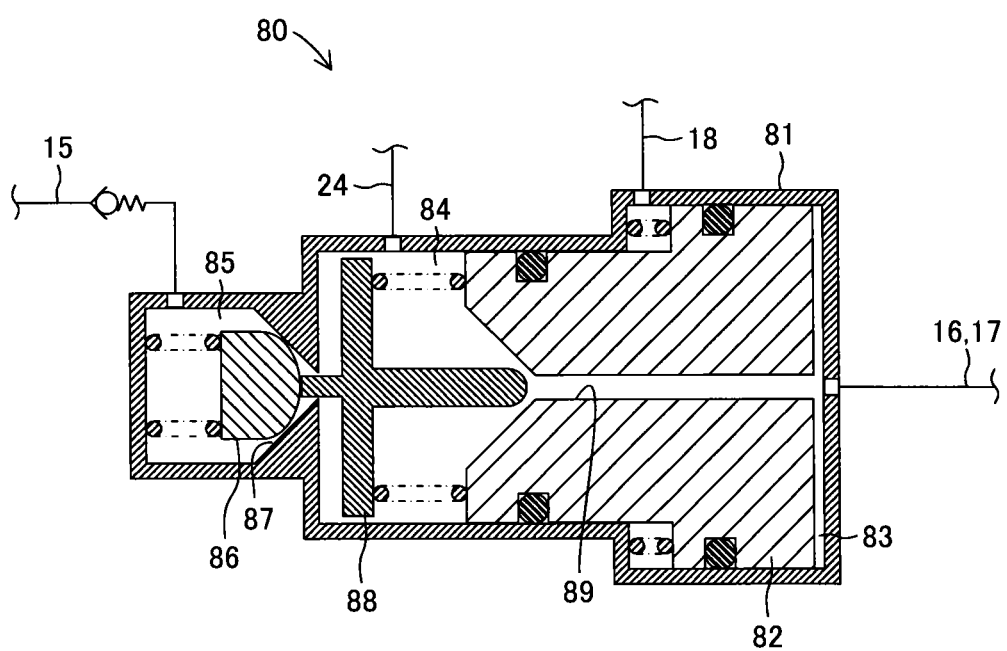
FIG. 2 is a schematic cross-sectional view illustrating a configuration of a pressure increasing mechanism of FIG. 1.

As illustrated in FIG. 2, the pressure increasing mechanism 80 includes a housing 81, and a stepped piston 82 fitted into the housing 81 in a liquid-tight and slidable manner. A large diameter chamber 83 is provided on a large diameter side of the stepped piston 82, and a small diameter chamber 84 is provided on a smaller diameter side thereof. The small diameter chamber 84 can communicate to a high pressure chamber 85 connected to the accumulator 32 of the power hydraulic pressure generation device 30 via a high pressure supply valve 86 and a valve seat 87. As illustrated in FIG. 2, the high pressure supply valve 86 is pressed against the valve seat 87 by a biasing force of a spring in the high pressure chamber 85, and is a normally-closed valve.

Moreover, a valve opening member 88 is provided in the small diameter chamber 84 so as to oppose the high pressure supply valve 86, and a spring is provided between the valve opening member 88 and the stepped piston 82. A biasing force of the spring acts toward a direction of separating the valve opening member 88 from the stepped piston 82. Moreover, as illustrated in FIG. 2, a return spring is provided between a step portion of the stepped piston 82 and the housing 81, thereby biasing the stepped piston 82 toward a backward moving direction. Note that, a stopper (not shown) is provided between the stepped piston 82 and the housing 81, thereby regulating a forward movement end position of the stepped piston 82.

Further, a communication passage 89 for communicating the large diameter chamber 83 and the small diameter chamber 84 to each other is formed in the stepped piston 82. The communication passage 89 causes the large diameter chamber 83 and the small diameter chamber 84 to communicate to each other in a state where the stepped piston 82 is separated from the valve opening member 88 at at least a backward movement end position of the stepped piston 82, and, when the stepped piston 82 moves forward to abut against the valve opening member 88, the communication passage 89 is shut off. The pressure increasing mechanism 80 configured in this way operates as a mechanical pressure increasing device (mechanical servo).

Note that, as illustrated in FIGS. 1 and 2, the high pressure chamber 85 and the power hydraulic pressure generation device 30 are connected to each other via the high pressure supply passage 15, and a check valve for permitting communication of the working fluid from the power hydraulic pressure generation device 30 (more specifically, from the accumulator 32) to the high pressure chamber 85 and preventing communication in an opposite direction is provided on the high pressure supply flow passage 15. The check valve provided in this way permits the communication of the working fluid from the power hydraulic pressure generation device 30 to the high pressure chamber 85 when the hydraulic pressure (namely, the accumulator pressure Pacc) of the power hydraulic pressure generation device 30 (more specifically, the accumulator 32) is higher than the hydraulic pressure of the high pressure chamber 85. The check valve is in the closed state when the hydraulic pressure (namely, the accumulator pressure Pacc) of the power hydraulic pressure generation device 30 is equal to or lower than the hydraulic pressure of the high pressure chamber 85, and prevents the flows in the both directions. Thus, even if a liquid leak occurs in the power hydraulic pressure generation device 30, the working fluid is prevented from flowing backward from the high pressure chamber 85 to the power hydraulic pressure generation device 30, and the hydraulic pressure in the small diameter chamber 84 is prevented from decreasing. Further, according to this embodiment, a first master pressure supply passage 16 for supplying the working fluid from the master pressure pipe 11 and a second master pressure supply passage 17 for supplying the working fluid from the master pressure pipe 12 are provided between the master pressure pipes 11 and 12 and an input side (namely, the large diameter chamber 83) of the pressure increasing mechanism 80, and the master cylinder pressure Pmc is supplied. Note that, a space formed between a step portion of the stepped piston 82 and the housing 81 is connected via the reservoir passage 18 to the reservoir 23.

A brief specific description is given of the pressure increasing mechanism 80. When the working fluid (master cylinder pressure Pmc) is supplied from the master cylinder 22 via the master pressure pipes 11 and 12 and the first master pressure supply passage 16 and the second master pressure supply passage 17 to the large diameter chamber 83 in the pressure increasing mechanism 80, the working fluid is supplied via the communication passage 89 to the small diameter chamber 84. Then, when the force in the forward moving direction acting on the stepped piston 82 by the supply of the working fluid (master cylinder pressure Pmc) (caused by the master cylinder pressure Pmc acting on the large diameter chamber 83) becomes larger than the biasing force of the return spring, the stepped piston 82 moves forward. Then, when the stepped piston 82 abuts against the valve opening member 88, and the communication passage 89 is shut off, the hydraulic pressure in the small diameter chamber 84 increases, and the working fluid increased in pressure (namely, the servo pressure Ps) is output via the servo pressure pipe 24 to the hydraulic pressure booster 21.

Moreover, when the high pressure supply valve 86 is switched to the open state by the forward movement of the valve opening member 88, the high pressure working fluid is supplied from the high pressure chamber 85 to the small diameter chamber 84, resulting in an increase in hydraulic pressure of the small diameter chamber 84. On the other hand, if the hydraulic pressure of the working fluid accumulated in the accumulator 32 of the power hydraulic pressure generation device 30 is higher than the hydraulic pressure in the high pressure chamber 85, the hydraulic pressure in the accumulator 32 is supplied via the check valve on the high pressure supply passage 15 to the high pressure chamber 85, and is then supplied to the small diameter chamber 84. Then, in the stepped piston 82, the hydraulic pressure in the large diameter chamber 83 is adjusted to such a magnitude that the force acting on the large diameter side (master cylinder pressure Pmc×pressure receiving area) and the force acting on the small diameter side (servo pressure Ps×pressure receiving area) are balanced each other, and the adjusted hydraulic pressure is output. Thus, the pressure increasing mechanism 80 can be considered as a mechanical booster mechanism.

On the other hand, when the hydraulic pressure in the accumulator 32 is equal to or less than the hydraulic pressure in the high pressure chamber 85, the check valve provided on the high pressure supply passage 15 prevents the flow of the working fluid between the accumulator 32 and the high pressure chamber 85, and the stepped piston 82 cannot move forward any more. Moreover, the stepped piston 82 may abut against the stopper to be restrained from moving forward.

The power hydraulic pressure generation device 30 and the hydraulic pressure control valve device 50 are controlled to be driven by the brake ECU 100 serving as control means. The brake ECU 100 includes a microcomputer constructed by a CPU, a ROM, a RAM, and the like as a main component, and includes a pump drive circuit, an electromagnetic valve drive circuit, an interface for inputting various sensor signals, and a communication interface. All the respective electromagnetic on-off valves 61 to 64, 66, and 72, and the linear control valves 65 provided in the hydraulic pressure control valve device 50 are connected to the brake ECU 100, and the open/closed states and the opening degrees (for the linear control valves 65) are controlled by solenoid drive signals output from the brake ECU 100. Moreover, the motor 33 provided to the power hydraulic pressure generation device 30 is also connected to the brake ECU 100, and is controlled to be driven by a motor drive signal output from the brake ECU 100.

The hydraulic pressure control valve device 50 is provided with an accumulator pressure sensor 101 as first hydraulic pressure detection means, a master cylinder pressure sensor 102 as second hydraulic pressure detection means, and a control pressure sensor 103 as third hydraulic pressure detection means. The accumulator pressure sensor 101 detects the accumulator pressure Pacc which is a hydraulic pressure of the working fluid in the accumulator pressure flow passage 55 on the power hydraulic pressure generation device 30 side (upstream side) with respect to the pressure increasing linear control valve 65A. The accumulator pressure sensor 101 outputs a signal representing the detected accumulator pressure Pacc to the brake ECU 100. The brake ECU 100 reads the accumulator pressure Pacc at a predetermined cycle, and, if the accumulator pressure Pacc is less than the predetermined lowest set pressure, the brake ECU 100 drives the motor 33 to pressurize the working fluid by the pressurizing pump 31, thereby controlling the accumulator pressure Pacc to be always maintained within a set pressure range.

The master cylinder pressure sensor 102 detects the master cylinder pressure Pmc which is a hydraulic pressure of the working fluid in the master pressure flow passage 53 on the master cylinder 22 side (upstream side) with respect to the master cut valve 63. In this case, it should be understood that the present invention can also be carried out so that the master cylinder pressure sensor 102 is provided to the master pressure flow passage 54 on an upstream side with respect to the location where the master cut valve 64 is provided. The master cylinder pressure sensor 102 outputs a signal representing the detected master cylinder pressure Pmc to the brake ECU 100. The control pressure sensor 103 outputs a signal representing the control pressure Px (corresponding to the wheel cylinder pressure at the wheel cylinder 42 which communicates to the main flow passage 52) which is a hydraulic pressure of the working fluid in the main flow passage 52 to the brake ECU 100.

Moreover, a stroke sensor 104 as stroke detection means provided on the brake pedal 10 is connected to the brake ECU 100. The stroke sensor 104 outputs to the brake ECU 100 a signal representing a pedal stroke which is a stepping amount (operation amount) of the brake pedal 10 by the driver, namely, a total stroke Sm of movable parts (such as a stoke of the pressurizing piston 22*a*, a deflection of the stroke adjustment spring 22*d*, and a stroke of the piston 70*a* in the stroke simulator 70) constructing the master cylinder 22 coupled to the brake pedal 10. Moreover, a wheel speed sensor 105 is connected to the brake ECU 100. The wheel speed sensor 105 detects a wheel speed Vx, which is a rotational speed of the front and rear right and left wheels, and outputs the signal representing the detected wheel speed Vx to the brake ECU 100. Further, an indicator 106 for notifying the driver of an abnormality occurring on the brake device is connected to the brake ECU 100. The indicator 106 follows the control by the brake ECU 100, and notifies the driver of a failure (abnormality) occurring on the brake device as described later. Note that, a stepping force sensor for detecting the stepping force F input by the driver on the brake pedal 10 can be included as another sensor.

A description is now given of brake control carried out by the brake ECU 100. In the normal state in which the brake device can normally operate, the brake ECU 100 carries out the brake control in a linear control mode (4S mode) of adjusting the hydraulic pressure (more specifically, the accumulator pressure Pacc) output from the power hydraulic pressure generation device 30 by using the linear control valve 65, and transmitting the adjusted hydraulic pressure to the respective wheel cylinders 42. On the other hand, for example, if a failure (abnormality) such as a leak of the working fluid occurs in the brake device, the brake ECU 100 carries out the brake control in a backup mode (2S mode) of transmitting the hydraulic pressure (more specifically, the master cylinder pressure Pmc) generated in the master cylinder 22 by the stepping force F of the driver to the wheel cylinders 42FR and 42FL for the front right and left wheels independently of the rear right and left wheels, and adjusting the hydraulic pressure (more specifically, the accumulator pressure Pacc) output from the power hydraulic pressure generation device 30 by using the linear control valve 65 and then transmitting the adjusted hydraulic pressure to the wheel cylinders 42RR and 44RL for the rear right and left wheels. Then, the brake ECU 100 determines the state of the leak of the working fluid, specifically, from which wheel cylinder 42 the working fluid is leaking in the backup mode as described later, and takes a countermeasure selected depending on the determination.

Figure 3:
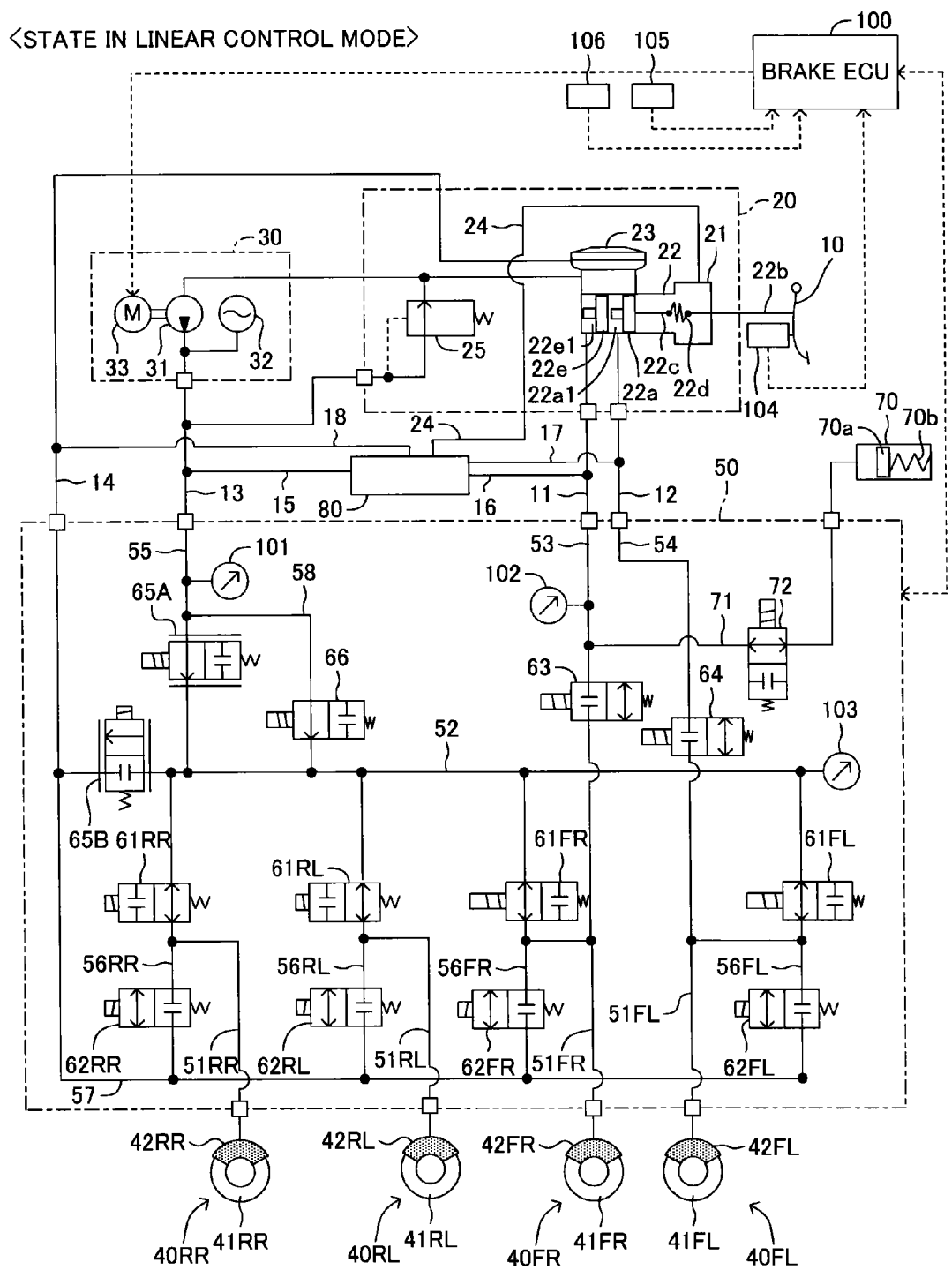
FIG. 3 is a diagram illustrating a linear control mode state by the vehicle brake device according to the embodiment of the present invention.

First, as illustrated in FIG. 3, in the linear control mode, the brake ECU 100 maintains each of the normally-open master cut valves 63 and 64 in the closed state by the current supply to the solenoids, and maintains the simulator cut valve 72 in the open state by the current supply to the solenoid. Moreover, the brake ECU 100 controls the current supply amounts (current values) to the solenoids of the pressure increasing linear control valve 65A and the pressure decreasing linear control valve 65B so as to have the opening degrees corresponding to the current supply amounts, and, if necessary, maintains the adjusted flow rate cut valve 66 in the open state by the current supply to the solenoid.

Further, the brake ECU 100 maintains the normally-closed holding valves 61FR and 61FL in the open state by the current supply to the solenoids, maintains the normally-open holding valves 61RR and 61RL in the open state, and maintains the normally-closed pressure decreasing valves 62FR, 62FL, 62RR, and 62RL in the closed state. Although a detailed description is not given, for example, if the well-known anti-lock brake control based on the wheel speed Vx detected by the wheel speed sensor 105 is necessary to carry out, the brake ECU 100 controls the current supply to the respective solenoids of the holding valves 61 and the pressure decreasing valves 62 based on the anti-lock brake control, thereby bringing the holding valves 61 and the pressure decreasing valves 62 into the open state or the closed state.

The open state and the closed state of each of the valves constructing the hydraulic pressure control valve device 50 are controlled in this way. Thus, both the master cut valves 63 and 64 are maintained in the closed state in the linear control mode, and hence the hydraulic pressure (namely, the master cylinder pressure Pmc) output from the master cylinder unit 20 is not transmitted to the wheel cylinders 42. On the other hand, the pressure increasing linear control valve 65A and the pressure decreasing linear control valve 65B are in the current supply control state of the solenoids, and hence the hydraulic pressure (namely, the accumulator pressure Pacc) output from the power hydraulic pressure generation device 30 is adjusted by the pressure increasing linear control valve 65A and the pressure decreasing linear control valve 65B, and is transmitted to the wheel cylinders 42 at the four wheels. In this case, the holding valves 61 are maintained in the open state, and the pressure decreasing valves 62 are maintained in the closed state, and hence the wheel cylinders 42 each communicate to the main flow passage 52, and all the wheel cylinder pressures have the same value at the four wheels. The wheel cylinder pressure can be detected by the control pressure sensor 103 as the control pressure Px.

By the way, the vehicle on which the brake device according to this embodiment is installed may be, for example, an electric vehicle (EV) including a running motor driven by a battery power supply, a hybrid vehicle (HV) including an internal combustion engine in addition to the running motor, and a plug-in hybrid vehicle (PHV) which is a hybrid vehicle (HV) further including a battery rechargeable by using an external power supply. Each of those vehicles can carry out regenerative braking in the following manner. Electric power is generated by converting rotational energy of the wheels into electric energy by the running motor, thereby generating electricity, and the battery is charged by using the generated electric power, thereby acquiring a braking force. If the regenerative braking is carried out, a braking force is generated by the brake device, which is acquired by subtracting a regenerative braking force amount from a total braking force required for braking the vehicle, thereby carrying out brake regeneration cooperative control by using both the regenerative braking and the hydraulic braking.

Specifically, the brake ECU 100 receives a braking request, and then starts the brake regeneration cooperative control. The braking request is generated when the braking force needs to be applied to the vehicle, for example, when the driver carries out the stepping operation (hereinafter also simply referred to as "brake operation") on the brake pedal 10, or when automatic braking is requested to be operated. On this occasion, when the driver carries out the stepping operation on the brake pedal 10, the master cylinder pressure Pmc is supplied via the master pressure pipes 11 and 12, the first master pressure supply passage 16, and the second master pressure supply passage 17 to the pressure increasing mechanism 80. As a result, the servo pressure Ps is supplied from the pressure increasing mechanism 80 to the hydraulic pressure booster 21 via the servo pressure pipe 24, and the stepping operation on the brake pedal 10 by the driver is assisted. Moreover, the automatic brake may be operated in traction control, vehicle stability control, headway distance control, and collision prevention control, and if start conditions for those pieces of control are satisfied, the braking request is generated.

When the brake ECU 100 receives the braking request, the brake ECU 100 acquires at least one of the master cylinder pressure Pmc detected by the master cylinder pressure sensor 102 or the stroke Sm detected by the stroke sensor 104 as the brake operation amount, and calculates a target braking force which increases along with an increase in the master cylinder pressure Pmc and/or the stroke Sm. Regarding the brake operation amount, the present invention can also be carried out so that the target braking force is detected based on, for example, a stepping force F on the brake pedal 10 acquired by providing a stepping force sensor for detecting the stepping force F in place of the acquisition of the master cylinder pressure Pmc and/or the stroke Sm.

Then, the brake ECU 100 transmits information representing the calculated target braking force to a hybrid ECU (not shown) in the brake regeneration cooperative control. The hybrid ECU calculates the braking force generated by the power regeneration among the target calculation forces, and transmits information representing the regenerative braking force, which is a calculation result, to the brake ECU 100. As a result, the brake ECU 100 can calculate the target hydraulic pressure braking force, which is the braking force to be generated on the brake device, by subtracting the regenerative braking force from the target braking force. The regenerative braking force generated by the power regeneration carried out by the hybrid ECU is changed not only by a change in the rotational speed of the motor but also by the regenerative power control depending on a charged state (SOC: state of charge) of the battery. Thus, an appropriate target hydraulic pressure braking force can be calculated by subtracting the regenerative braking force from the target braking force.

The brake ECU 100 calculates, based on the calculated target hydraulic pressure braking force, a target hydraulic pressure for each of the wheel cylinders 42 corresponding to the target hydraulic pressure braking force, and controls the drive currents for the pressure increasing linear control valve 65A and the pressure decreasing linear control valve 65B by feedback control so that the wheel cylinder pressure is equal to the target hydraulic pressure. In other words, the brake ECU 100 controls the current supply amounts (current values) for the solenoids of the pressure increasing linear control valve 65A and the pressure decreasing linear control valve 65B so that the control pressure Px (=wheel cylinder pressure) detected by the control pressure sensor 103 follows the target hydraulic pressure.

As a result, the working fluid is supplied from the power hydraulic pressure generation device 30 via the pressure increasing linear control valve 65A and, if necessary, via the adjusted flow rate cut valve 66 to the respective wheel cylinders 42, resulting in generation of the braking forces on the wheels. Moreover, the working fluid is discharged from the wheel cylinders 42 via the pressure decreasing linear control valve 65B to the reservoir flow passage 57, and the braking forces generated on the respective wheels are thus appropriately adjusted.

Then, when the braking operation by the driver is released, the current supply to the solenoids of all the electromagnetic valves constructing the hydraulic pressure control valve device 50 is shut off, and, finally, all the electromagnetic valves are returned to original positions illustrated in FIG. 1. Moreover, the stepped piston 82 is returned to the backward movement end in the pressure increasing mechanism 80, and the large diameter chamber 83 and the small diameter chamber 84 communicate to each other via the communication passage 89. All the electromagnetic valves are finally returned to the original positions in this way. Consequently, the hydraulic pressure (working fluid) in the brake cylinder 42FR on the front right wheel is returned via the master cut valve 63 in the open state to the master cylinder 22 and the reservoir 23, and the hydraulic pressure (working fluid) in the brake cylinder 42FL on the front left wheel is returned via the master cut valve 64 in the open state to the master cylinder 22 and the reservoir 23. The hydraulic pressures (working fluid) of the brake cylinder 42RR on the rear right wheel and the brake cylinder 42RL on the rear left wheel are returned respectively via the pressure decreasing valves 62RR and 62RL temporarily brought into the open state and the reservoir flow passage 57 to the reservoir 23.

Note that, the present invention does not always need to carry out the brake regeneration cooperative control, and it should be understood that the present invention can be applied to a vehicle on which the regenerative braking force is not generated. In this case, the target hydraulic pressure only needs to be directly calculated based on the brake operation amount. The target hydraulic pressure is set by using a map, a calculation equation, or the like so as to have a large value as the brake operation amount increases.

By the way, in a state where the brake control is carried out in the linear control mode (4S mode) as described above, when such a failure that the hydraulic pressure cannot be transmitted to the respective wheel cylinders 42 due to a working fluid leak abnormality occurs in the brake device, the brake ECU 100 switches the linear control mode to the backup mode and carries out the brake control. Specifically, in this embodiment, if the working fluid leaks from each of the wheel cylinders 42 to the outside in brake systems (hereinafter referred to as "wheel cylinder systems") for supplying the respective wheel cylinders 42 for the four wheels with the working fluid, the brake ECU 100 switches the linear control mode to the backup mode, and identifies the wheel cylinder system on which the leak of the working fluid occurs, namely, the failed wheel cylinder system. Then, the brake ECU 100 shuts off the supply of the working fluid to the wheel cylinder system in which the leak of the working fluid occurs (that is, a failure occurs) (hereinafter this wheel cylinder system is referred to as "leak-occurring wheel cylinder system"), and supplies the other wheel cylinder systems with the working fluid (namely, the hydraulic pressure), thereby generating braking forces on the wheels. A detailed description is now given of the determination of occurrence of the leak of the working fluid in the wheel cylinder system, the switching from the linear control mode to the backup mode, the identification of the leak-occurring wheel cylinder system, and how the other wheel cylinder systems are treated.

a. Leak Occurrence Determination of Working Fluid in Wheel Cylinder System

As described above, in the linear control mode, the holding valves 61 corresponding to the respective wheel cylinders 42 are maintained in the open state, and the hydraulic pressure (namely, the accumulator pressure Pacc) output from the accumulator 32 of the power hydraulic pressure generation device 30 is adjusted by the pressure increasing linear control valve 65A and the pressure decreasing linear control valve 65B, and is transmitted to the respective wheel cylinders 42 on the four wheels. Therefore, the respective wheel cylinder systems are configured to communicate to the accumulator pressure flow passage 55 in the linear control mode. As a result, when a leak of the working fluid occurs in any one of the wheel cylinder systems corresponding to the four wheels, the accumulator pressure Pacc detected by the accumulator pressure sensor 101 (or the control pressure Px detected by the control pressure sensor 103) decreases.

Thus, the brake ECU 100 reads the accumulator pressure Pacc from the accumulator pressure sensor 101 at a predetermined short cycle in the linear control mode. Then, if the read accumulator pressure Pacc has decreased to a value less than a predetermined value Pacc0 set in advance for determining the leak of the working fluid in the wheel cylinder systems, the brake ECU 100 determines that a leak of the working fluid occurs in any one of the wheel cylinder systems corresponding to the four wheels.

b. Switching from Linear Control Mode to Backup Mode

When the brake ECU 100 determines that a leak of the working fluid occurs in any one of the wheel cylinder systems corresponding to the four wheels, the brake ECU 100 switches the linear control mode to the backup mode and continues the brake control.

Figure 4:
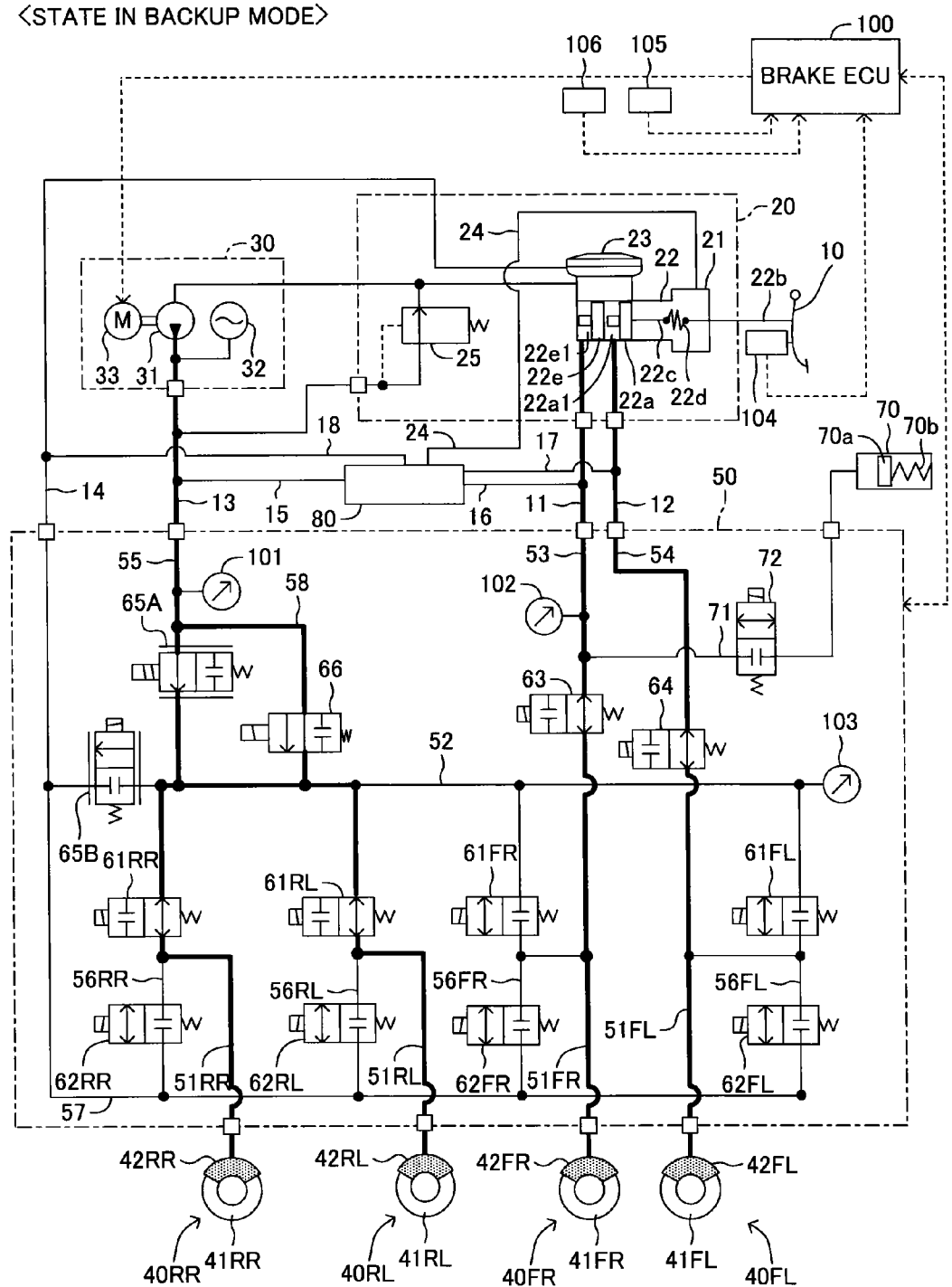
FIG. 4 is a diagram illustrating a backup mode state by the vehicle brake device according to the embodiment of the present invention.

Specifically, as illustrated in FIG. 4, in the backup mode, the brake ECU 100 shuts off the current supply to the solenoids of the master cut valves 63 and 64 in the closed state to return the master cut valves 63 and 64 to the open state, and shuts off the current supply to the solenoid of the simulator cut valve 72 in the open state to return the simulator cut valve 72 to the closed state. Moreover, the brake ECU 100 shuts off the current supply to the solenoids of the holding valves 61FR and 61FL in the open state on the front right and left wheel side to return the holding valves 61FR and 61FL to the closed state, and maintains the pressure decreasing valves 62FR and 62FL, which have been in the closed state, in the closed state. As a result, regarding the front right and left wheels in the backup mode, a wheel cylinder system on the front right wheel side in which the wheel cylinder 42FR communicates to the master pressure pipe 11 is formed, and a wheel cylinder system on the front left wheel side in which the wheel cylinder 42FL communicates to the master pressure pipe 12 is formed. On this occasion, the wheel cylinder system on the front right wheel side and the wheel cylinder system on the front left wheel side are independent of each other.

On the other hand, the brake ECU 100 maintains the holding valves 61RR and 61RL in the open state, and maintains the pressure decreasing valves 62RR and 62RL, which have been in the closed state, in the closed state for the rear right and left wheels. Moreover, also in the backup mode according to this embodiment, the brake ECU 100 controls the current supply amounts (current values) to the solenoids of the pressure increasing linear control valve 65A and the pressure decreasing linear control valve 65B, thereby continuously controlling the valves so as to have opening degrees corresponding to the current supply amounts, and if necessary, maintains the adjusted flow rate cut valve 66 in the open state by the current supply to the solenoid. As a result, regarding the rear right and left wheels in the backup mode, wheel cylinder systems where the wheel cylinders 42RR and 42RL communicate to each other via the main flow passage 52 are formed, and the hydraulic pressure (namely, the accumulator pressure Pacc) output from the power hydraulic pressure generation device 30 is adjusted by the pressure increasing linear control valve 65A and the pressure decreasing linear control valve 65B and transmitted.

Thus, the wheel cylinder system for the front right wheel, the wheel cylinder system for the front left wheel, and the wheel cylinder systems for the rear right and left wheels are formed in the backup mode in this embodiment. The master cylinder pressure Pmc generated by the master cylinder 22 into which the servo pressure Ps is introduced from the pressure increasing mechanism 80 is supplied for each of the wheel cylinder systems for the front right and left wheels. The accumulator pressure Pacc adjusted by the linear control is continuously supplied from the power hydraulic pressure generation device 30 to the wheel cylinder systems for the rear right and left wheels. At a time point when the linear control mode is switched to the backup mode, the wheel cylinder system in which the leak of the working fluid occurs, in other words, the failure occurs has not been identified yet.

c. Determination of Leak-Occurring Wheel Cylinder System, and how Other Wheel Cylinder Systems are Treated A description is now given of the determination of and the countermeasure against a working fluid leak in the wheel cylinder system for the front left wheel. The brake ECU 100 has acquired the accumulator pressure Pacc detected by the accumulator pressure sensor 101, the master cylinder pressure Pmc detected by the master cylinder pressure sensor 102, and the control pressure Px detected by the control pressure sensor 103, and acquired the stroke Sm detected by the stroke sensor 104.

Figure 5:
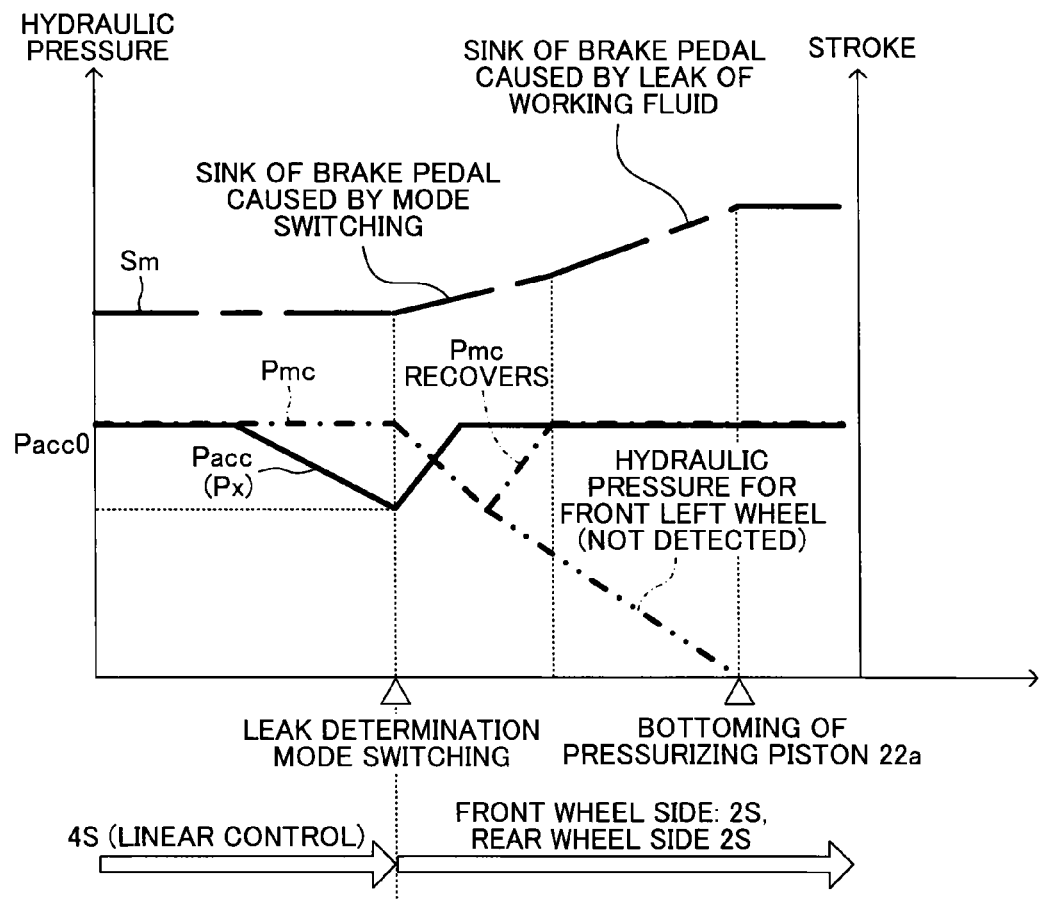
FIG. 5 is a graph showing determination of a working fluid leak abnormality occurring in a wheel cylinder system for a front left wheel according to the embodiment of the present invention.

In this case, as shown in FIG. 5, in the linear control mode, the respective wheel cylinders 42 communicate to one another via the main flow passage 52, and if a leak of the working fluid occurs in the wheel cylinder system for the front left wheel, the accumulator pressure Pacc (control pressure Px) decreases to a value less than the predetermined value Pacc0 set for determining the leak of the working fluid. As a result, the brake ECU 100 switches the linear control mode to the backup mode.

When the brake control is switched to the backup mode in this way, as described above, the communication between the front wheel side and the rear wheel side is shut off, and if the leak of the working fluid occurs in the wheel cylinder system for the front left wheel, as shown in FIG. 5, the accumulator pressure Pacc detected by the accumulator pressure sensor 101 (or the control pressure Px detected by the control pressure sensor 103) quickly turns to increase, and recovers. Moreover, when the brake control is switched to the backup mode, as described above, the communication between the front left wheel side and the front right wheel side is shut off, and if the leak of the working fluid occurs in the wheel cylinder system for the front left wheel, as shown in FIG. 5, the master cylinder pressure Pmc detected by the master cylinder pressure sensor 102 quickly turns to increase and recovers in response to the brake operation by the driver.

In other words, if the accumulator pressure Pacc (control pressure Px) quickly recovers and the master cylinder pressure Pmc quickly recovers in response to the switching from the linear control mode to the backup mode, the brake ECU 100 determines that a leak of the working fluid highly possibly occurs in the master cylinder system for the front left wheel, which does not communicate to the master cylinder pressure sensor 102. Moreover, the brake ECU 100 has acquired the stroke Sm from the stroke sensor 104. After the accumulator pressure Pacc (control pressure Px) and the master cylinder pressure Pmc have quickly recovered, as shown in FIG. 5, if such a state that the stroke Sm increases until bottoming in which the pressurizing piston 22*a* abuts against the pressurizing piston 22*e* in the master cylinder 22 occurs, the brake ECU 100 determines that a leak of the working fluid occurs in the wheel cylinder system for the front left wheel.

Figure 6:
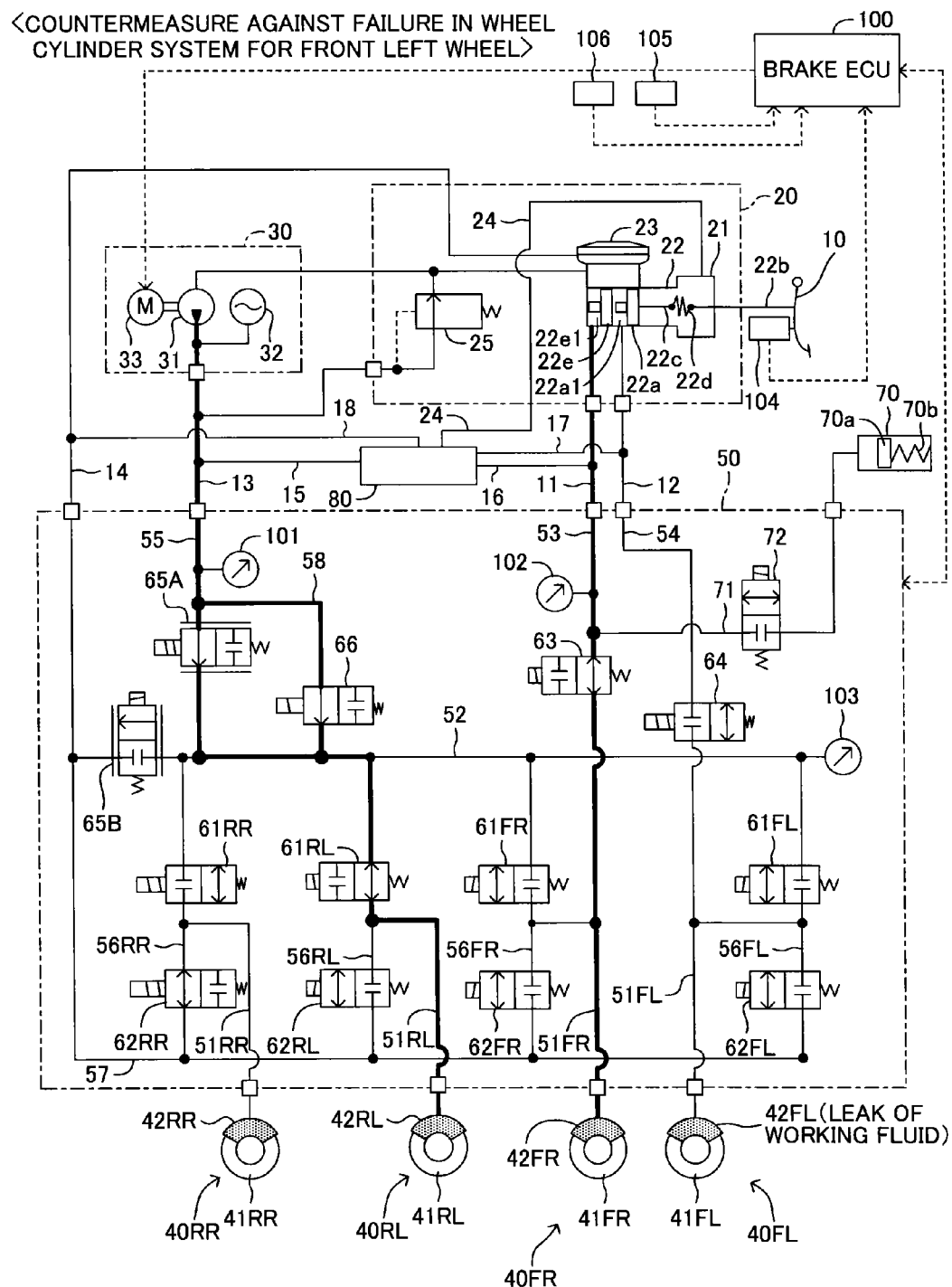
FIG. 6 is a diagram illustrating a countermeasure for the case where it is determined that a working fluid leak abnormality has occurred in the wheel cylinder system for the front left wheel.

When the brake ECU 100 determines (identifies) that a leak of the working fluid occurs in the wheel cylinder system for the front left wheel in this way, as illustrated in FIG. 6, the brake ECU 100 maintains the master cut valve 63 in the open state, and supplies the solenoid of the master cut valve 64 with a current to switch the master cut valve 64 to the closed state. As a result, the working fluid (master cylinder pressure Pmc) is supplied to the wheel cylinder 42FR for the front right wheel from the master cylinder 22 via the master pressure pipe 11, and the supply of the working fluid to the wheel cylinder 42FL for the front left wheel from the master cylinder 22 via the master pressure pipe 12 is shut off, thereby preventing the working fluid from leaking from the wheel cylinder 42FL.

Moreover, when the brake ECU 100 identifies that a leak of the working fluid occurs in the wheel cylinder system for the front left wheel, the brake ECU 100 supplies the adjusted accumulator pressure Pacc to only the wheel cylinder system for the rear left wheel at a diagonal position with respect to the wheel cylinder system for the front right wheel out of the wheel cylinder systems for the rear right and left wheels. In other words, the brake ECU 100 switches the holding valve 61RR constructing the wheel cylinder system for the rear right wheel to the closed state by the current supply to the solenoid, and switches the pressure decreasing valve 62RR to the open state by the current supply to the solenoid, whereas the brake ECU 100 maintains the holding valve 61RL constructing the wheel cylinder system for the rear left wheel in the open state, and maintains the pressure decreasing valve 62RL in the closed state.

Figure 7:
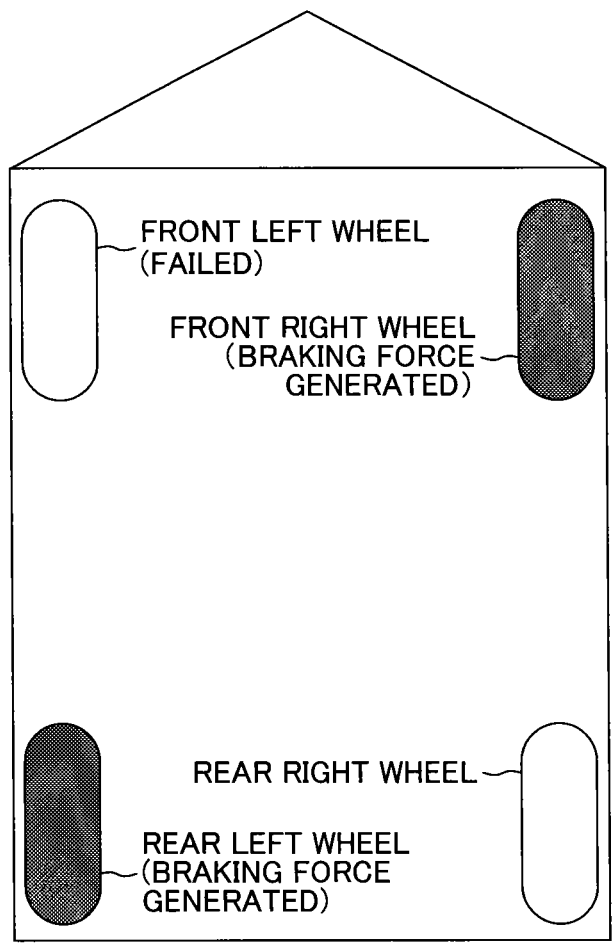
FIG. 7 is a diagram illustrating a generated state of braking forces after the countermeasure of FIG. 6.

In this way, when the brake ECU 100 determines (identifies) that a leak of the working fluid occurs in the wheel cylinder system for the front left wheel, the brake ECU 100 supplies the wheel cylinder system for the front right wheel with the master cylinder pressure Pmc, and supplies the wheel cylinder system for the rear left wheel with the adjusted accumulator pressure Pacc, thereby, as illustrated in FIG. 7, carrying out diagonal wheel control of generating braking forces on two wheels at positions diagonal to each other. As a result, when the leak of the working fluid occurs in the wheel cylinder system for the front left wheel, the brake ECU 100 can prevent the working fluid from leaking from the leak-occurring wheel cylinder system in which the failure occurs to the outside, and can prevent a useless yaw behavior from being generated on the vehicle, thereby securing the appropriate braking forces while behavior stability is secured.

A description is now given of the case where a leak of the working fluid occurs in the wheel cylinder system for the front right wheel. Also in this case, the brake ECU 100 has acquired the accumulator pressure Pacc from the accumulator pressure sensor 101, the master cylinder pressure Pmc from the master cylinder pressure sensor 102, the control pressure Px from the control pressure sensor 103, and the stroke Sm from the stroke sensor 104.

Figure 8:
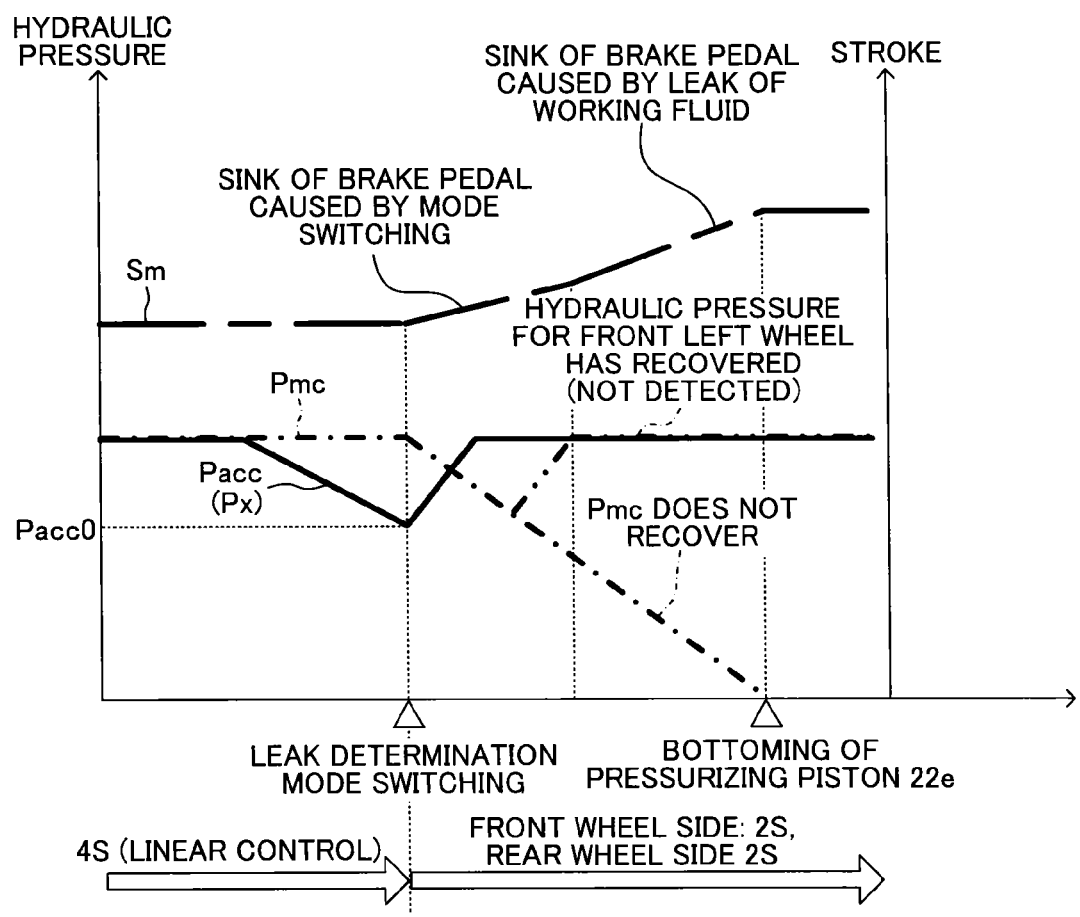
FIG. 8 is a graph showing determination of a working fluid leak abnormality occurring in a wheel cylinder system for a front right wheel according to the embodiment of the present invention.

Further, also when a leak of the working fluid occurs in the wheel cylinder system for the front right wheel so that the accumulator pressure Pacc (control pressure Px) has decreased to a value less than the predetermined value Pacc0 set in advance for determining the leak of the working fluid, the brake ECU 100 switches the linear control mode to the backup mode. As a result, the communication between the front wheel side and the rear wheel side is shut off, and hence if the leak of the working fluid occurs in the wheel cylinder system for the front right wheel, as shown in FIG. 8, the accumulator pressure Pacc detected by the accumulator pressure sensor 101 (or the control pressure Px detected by the control pressure sensor 103) quickly turns to increase, and recovers. On the other hand, when the brake control is switched to the backup mode, the communication between the front left wheel side and the front right wheel side is shut off, and if the leak of the working fluid occurs in the wheel cylinder system for the front right wheel, as shown in FIG. 8, the master cylinder pressure Pmc detected by the master cylinder pressure 102 does not turn to increase and does not recover even if the driver carries out the brake operation on the brake pedal 10.

In other words, if the accumulator pressure Pacc (control pressure Px) quickly recovers but the master cylinder pressure Pmc does not recover in response to the switching from the linear control mode to the backup mode, the brake ECU 100 determines that a leak of the working fluid highly possibly occurs in the master cylinder system for the front right wheel, which communicates to the master cylinder pressure sensor 102. Moreover, the brake ECU 100 has acquired the stroke Sm from the stroke sensor 104. After the accumulator pressure Pacc (control pressure Px) recovers, as shown in FIG. 8, if such a state that the stroke Sm increases until bottoming in which the pressurizing piston 22*e* of the master cylinder 22 abuts against the wall surface of the master cylinder 22 occurs, the brake ECU 100 determines that a leak of the working fluid occurs in the wheel cylinder system for the front right wheel.

Figure 9:
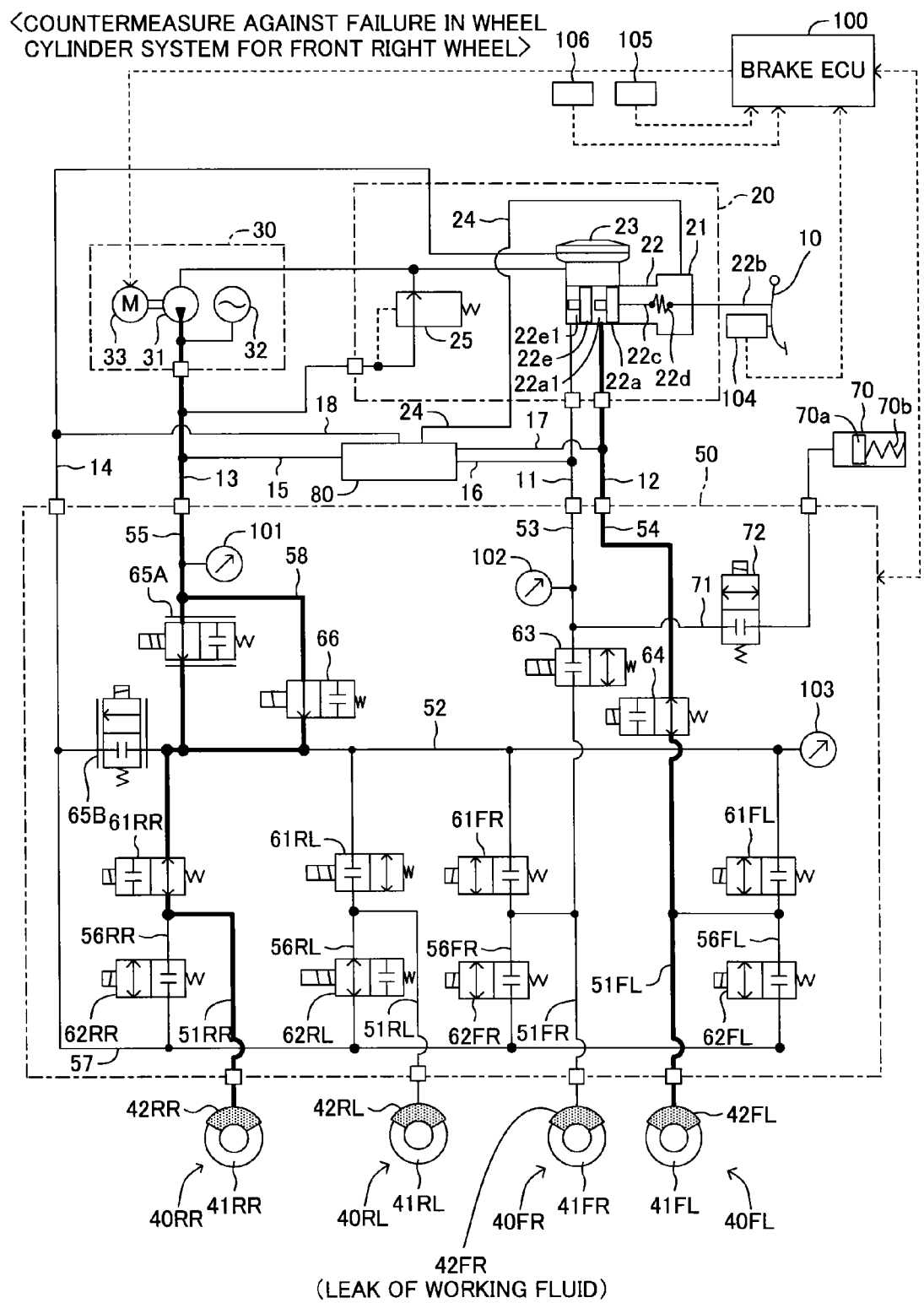
FIG. 9 is a diagram illustrating a countermeasure for the case where it is determined that a working fluid leak abnormality has occurred in the wheel cylinder system for the front right wheel.

When the brake ECU 100 determines (identifies) that a leak of the working fluid occurs in the wheel cylinder system for the front right wheel in this way, as illustrated in FIG. 9, the brake ECU 100 switches the master cut valve 63 to the closed state by the current supply to the solenoid, and maintains the master cut valve 64 in the open state. As a result, the working fluid (master cylinder pressure Pmc) is supplied to the wheel cylinder 42FL for the front left wheel from the master cylinder 22 via the master pressure pipe 12, and the supply of the working fluid to the wheel cylinder 42FR for the front right wheel from the master cylinder 22 via the master pressure pipe 11 is shut off, thereby preventing the working fluid from leaking from the wheel cylinder 42FR.

Moreover, when the brake ECU 100 identifies that a leak of the working fluid occurs in the wheel cylinder system for the front right wheel, the brake ECU 100 supplies the adjusted accumulator pressure Pacc to only the wheel cylinder system for the rear right wheel at a diagonal position with respect to the wheel cylinder system for the front left wheel out of the wheel cylinder systems for the rear right and left wheels. In other words, the brake ECU 100 switches the holding valve 61RL constructing the wheel cylinder system for the rear left wheel to the closed state by the current supply to the solenoid, and switches the pressure decreasing valve 62RL to the open state by the current supply to the solenoid, whereas the brake ECU 100 maintains the holding valve 61RR constructing the wheel cylinder system for the rear right wheel in the open state, and maintains the pressure decreasing valve 62RR in the closed state. In this case, the master cylinder pressure Pmc is not detected by the master cylinder pressure sensor 102, and hence the brake ECU 100 uses the stroke Sm detected by the stroke sensor 104 to determine the master cylinder pressure Pmc based on the relationship between the master cylinder pressure Pmc and the stroke Sm, which is set in advance. Then, the brake ECU 100 uses the determined master cylinder pressure Pmc to control the drive of the linear control valves 65, thereby adjusting the accumulator pressure Pacc.

Figure 10:
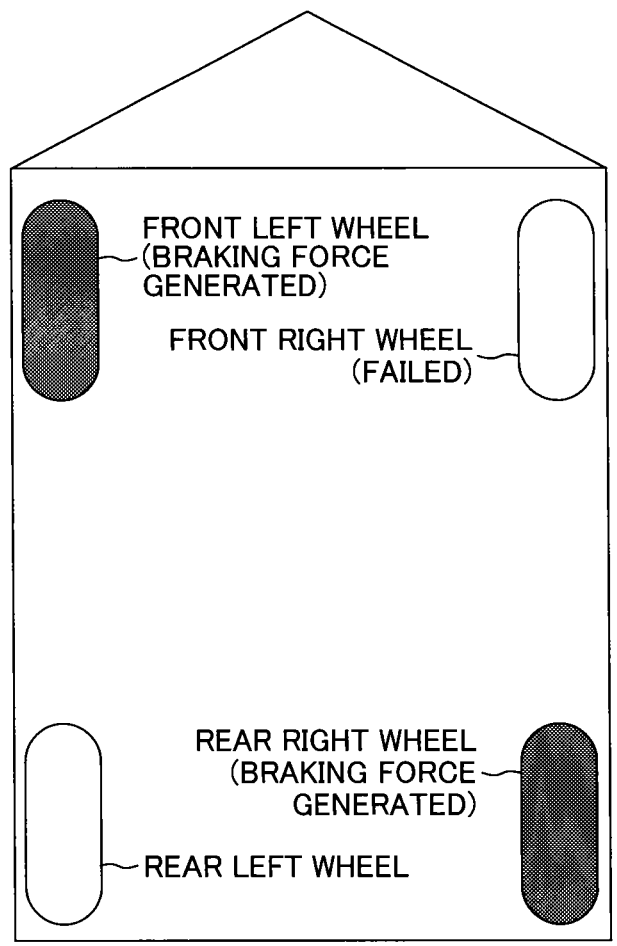
FIG. 10 is a diagram illustrating a generated state of braking forces after the countermeasure of FIG. 9.

In this way, when the brake ECU 100 determines (identifies) that a leak of the working fluid occurs in the wheel cylinder system for the front right wheel, the brake ECU 100 supplies the wheel cylinder system for the front left wheel with the master cylinder pressure Pmc, and supplies the wheel cylinder system for the rear right wheel with the adjusted accumulator pressure Pacc, thereby, as illustrated in FIG. 10, carrying out diagonal wheel control of generating braking forces on two wheels at positions diagonal to each other. As a result, when the leak of the working fluid occurs in the wheel cylinder system for the front right wheel, the brake ECU 100 can prevent the working fluid from leaking from the leak-occurring wheel cylinder system to the outside, and can prevent a useless yaw behavior from being generated on the vehicle, thereby securing the appropriate braking forces while behavior stability is secured.

On this occasion, when it is determined (identified) that a leak of the working fluid occurs in the wheel cylinder system for the front right wheel, it is assumed in the above description that a leak of the working fluid does not occur in the wheel cylinder system for the front left wheel. In other words, the wheel cylinder system on the front left wheel side according to this embodiment does not include means for directly detecting the hydraulic pressure (namely, the master cylinder pressure detection sensor), and hence if the brake control is switched to the backup mode, the hydraulic pressure in this wheel cylinder system cannot be recognized. Thus, when it is determined that a leak of the working fluid occurs in the wheel cylinder system for the front right wheel, a leak of the working fluid may also occur in the wheel cylinder system for the front left wheel.

By the way, if leaks of the working fluid occur in the wheel cylinder systems on the front right and left wheel side, the working fluid supplied via the master pressure pipes 11 and 12 of the master cylinder 22 cannot be pressurized, and, as a result, both the pressurizing pistons 22a and 22e stroke until the bottoming. The stroke Sm detected by the stroke sensor 104 when both the pressurizing pistons 22a and 22e stoke until the bottoming is larger than the stroke Sm detected when a leak of the working fluid occurs in the wheel cylinder system on the front left wheel side so that the pressurizing piston 22a strokes until the bottoming and the pressurizing piston 22e pressurizes the working fluid in response to the stroke, and larger than the stroke Sm detected when a leak of the working fluid occurs in the wheel cylinder system on the front right wheel side so that the pressurizing piston 22e strokes until the bottoming and the pressurizing piston 22a pressurizes the working fluid in response to the stroke.

Thus, when the master cylinder pressure Pmc detected by the master cylinder pressure sensor 102 does not recover, for example, if the stroke Sm detected by the stroke sensor 104 is larger than a stroke Sm0 set in advance, the brake ECU 100 can determine that a leak of the working fluid occurs in the wheel cylinder systems on the front right and left wheel side. Then, when the ECU 100 determines that a leak of the working fluid occurs in the wheel cylinder systems for the front right and left wheels in this way, the brake ECU 100 switches the master cut valve 63 to the closed state by the current supply to the solenoid, switches the master cut valve 64 to the closed state by the current supply to the solenoid, and maintains the master cut valves 63 and 64 in the closed state. As a result, the supply of the working fluid to the wheel cylinders 42FR and 42FL on the front right and left wheels from the master cylinder 22 via the master pressure pipes 11 and 12 is shut off, and the working fluid is prevented from leaking from the wheel cylinders 42FR and 42FL.

Moreover, when the brake ECU 100 determines that leaks of the working fluid occur in the wheel cylinder systems for the front right and left wheels, the brake ECU 100 supplies the wheel cylinder systems for the rear right and left wheels with the adjusted accumulator pressure Pacc. As a result, if the brake ECU 100 determines that a leak of the working fluid occurs in the wheel cylinder systems for the front right and left wheels, the brake ECU 100 generates braking forces on the two wheels of the rear right and left wheels, thereby preventing the working fluid from leaking from the wheel cylinder systems for the front right and left wheels to the outside, and securing the braking forces.

A description is now given of the case where a leak of the working fluid occurs in any one of the wheel cylinder systems for the rear right and left wheels. Also in this case, the brake ECU 100 has acquired the accumulator pressure Pacc from the accumulator pressure sensor 101, the master cylinder pressure Pmc from the master cylinder pressure sensor 102, the control pressure Px from the control pressure sensor 103, and the stroke Sm from the stroke sensor 104.

Figure 11:
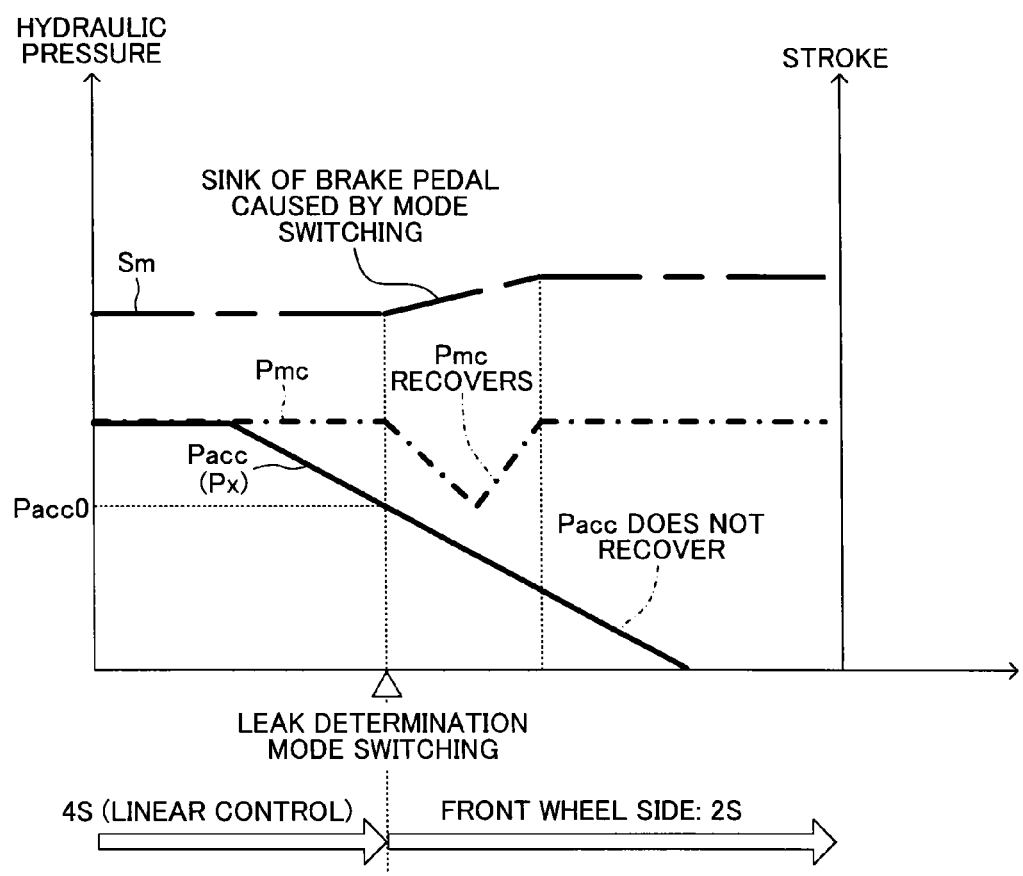
FIG. 11 is a graph showing determination of a working fluid leak abnormality occurring in wheel cylinder systems for rear right and left wheels according to the embodiment of the present invention.

Further, when a leak of the working fluid occurs in any one of the wheel cylinder systems for the rear right and left wheels, the accumulator pressure Pacc (control pressure Px) has decreased to a value less than the predetermined value Pacc0 set in advance for determining the leak of the working fluid, the brake ECU 100 switches the linear control mode to the backup mode. As a result, the communication between the front wheel side and the rear wheel side is shut off, and hence if a leak of the working fluid occurs in any one of the wheel cylinder systems for the rear right and left wheels, as shown in FIG. 11, the master cylinder pressure Pmc detected by the master cylinder pressure sensor 102 quickly turns to increase and recovers in response to the brake operation by the driver on the brake pedal 10. On the other hand, when the brake control is switched to the backup mode, as shown in FIG. 11, the accumulator pressure Pacc detected by the accumulator pressure sensor 101 (or the control pressure Px detected by the control pressure sensor 103) does not turn to increase and does not thus recover.

In other words, if the master cylinder pressure Pmc quickly recovers but the accumulator pressure Pacc (control pressure Px) does not recover in response to the switching from the linear control mode to the backup mode, the brake ECU 100 determines that a leak of the working fluid highly possibly occurs in any one of the wheel cylinder systems for the rear right and left wheels. Moreover, the brake ECU 100 has acquired the stroke Sm from the stroke sensor 104, and, as shown in FIG. 11, if the stroke Sm is approximately constant after the master cylinder pressure Pmc recovers, the ECU 100 determines that a leak of the working fluid occurs in any one of the wheel cylinder systems for the rear right and left wheels.

Figure 12:
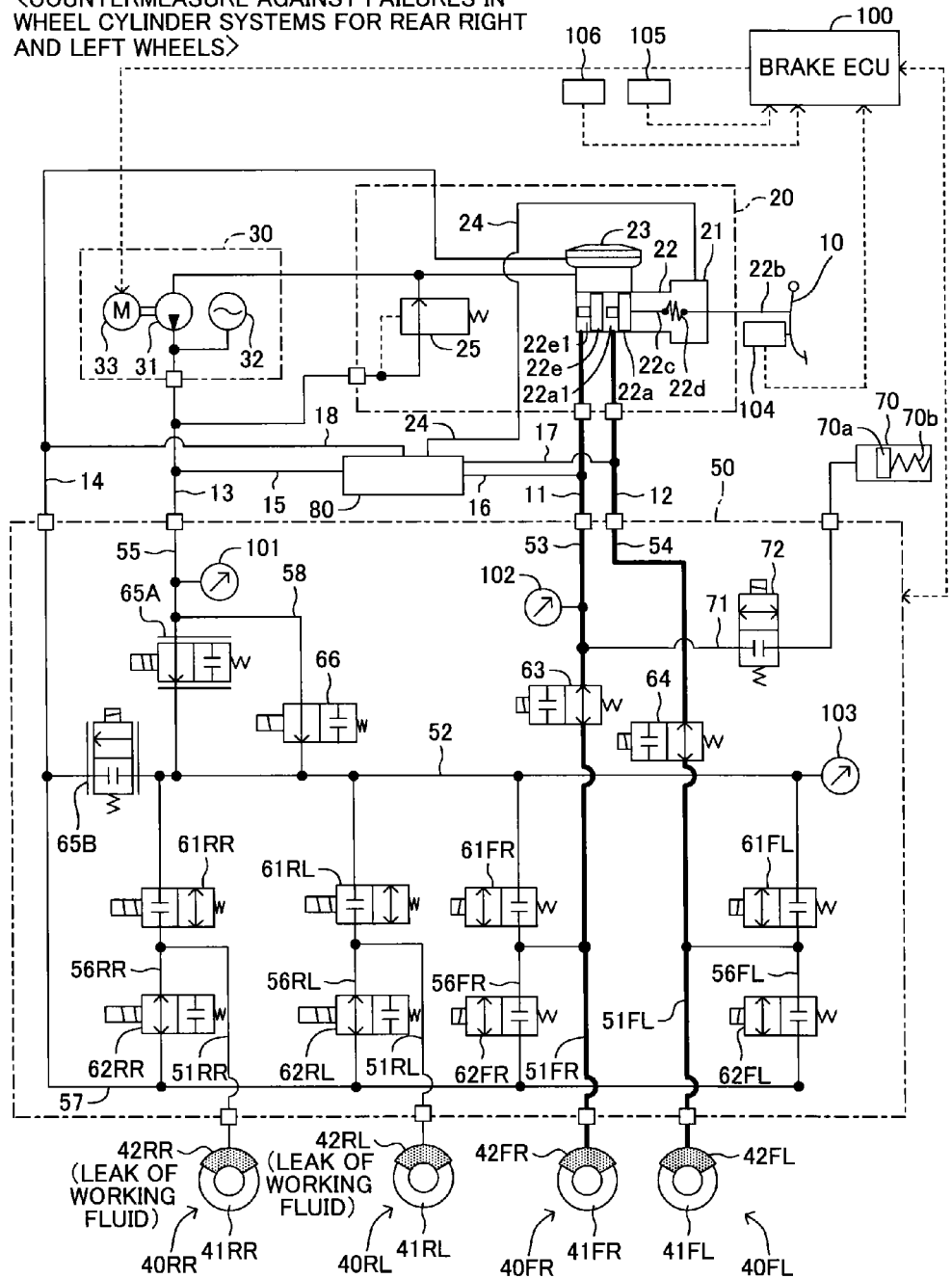
FIG. 12 is a diagram illustrating a countermeasure for the case where it is determined that a working fluid leak abnormality has occurred in the wheel cylinder systems for the rear right and left wheels.

When the brake ECU 100 determines (identifies) that a leak of the working fluid occurs in any one of the wheel cylinder systems for the rear right and left wheels in this way, as illustrated in FIG. 12, the brake ECU 100 switches the holding valves 61RR and 61RL constructing the wheel cylinder systems for the rear right and left wheels to the closed state by the current supply to the solenoids, switches the pressure decreasing valves 62RR and 62RL to the open state by the current supply to the solenoids, and maintains the states thereof. As a result, the supply of the working fluid from the accumulator 32 of the power hydraulic pressure generation device 30 to the wheel cylinder 42RR for the rear right wheel and the wheel cylinder 42RL for the rear left wheel is shut off, and a leak of the working fluid from at least one of the wheel cylinders 42RR and 42RL is prevented.

Figure 13:
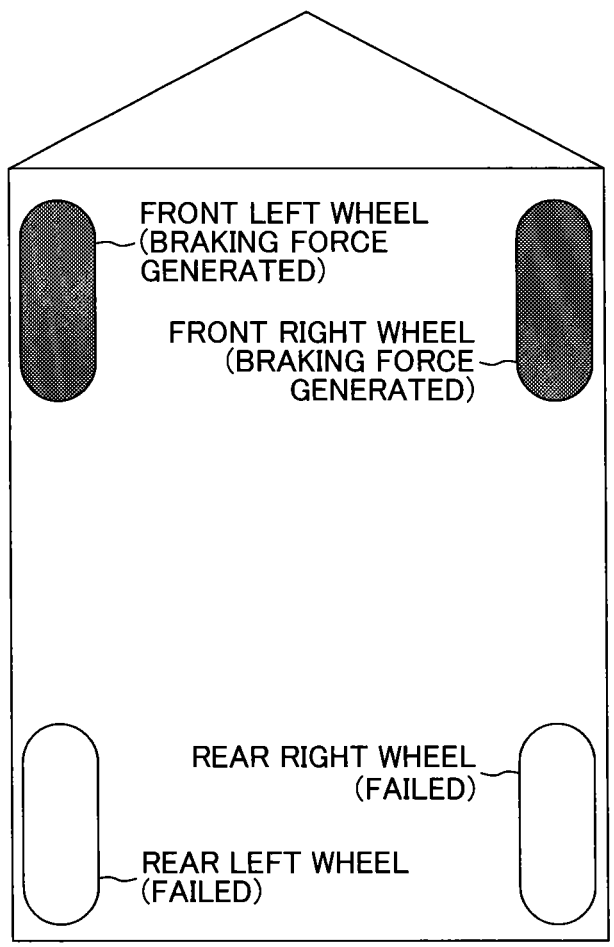
FIG. 13 is a diagram illustrating a generated state of braking forces after the countermeasure of FIG. 12.

Moreover, when the brake ECU 100 determines (identifies) that a leak of the working fluid occurs in any one of the wheel cylinder systems for the rear right and left wheels, the brake ECU 100 maintains the master cut valves 63 and 64 in the open state, thereby supplying the wheel cylinder 42FR for the front right wheel and the wheel cylinder 42FL for the front left wheel with the working fluid (master cylinder pressure Pmc). In this way, when the brake ECU 100 identifies that a leak of the working fluid occurs in any one of the wheel cylinder systems for the rear right and left wheels, the brake ECU 100 supplies the wheel cylinder systems for the front right and left wheels with the master cylinder pressure Pmc to generate, as illustrated in FIG. 13, braking forces on the two wheels of the front right and left wheels. In this manner, the working fluid can be prevented from leaking from any one of the wheel cylinder systems for the rear right and left wheels to the outside, and a useless yaw behavior can be prevented from being generated on the vehicle, resulting in securing appropriate braking forces in the state where behavior stability is secured.

As understood from the above description, according to this embodiment, it is possible to use the accumulator pressure sensor 101, the master cylinder pressure sensor 102, the control pressure sensor 103, and the stroke sensor 104 which are various sensors hitherto installed on the vehicle brake device to appropriately determine whether or not a failure (abnormality) caused by a leak of the working fluid to the outside occurs in any one of the wheel cylinder systems for the front right wheel, the front left wheel, and the rear right and left wheels. Thus, a leak-occurring wheel cylinder system in which a failure occurs can be determined (identified) by using an inexpensive configuration without an increase in cost. Because the leak-occurring wheel cylinder system can be appropriately determined (identified) in this way, the other normal wheel cylinder systems in which no failure occurs can be efficiently utilized to transmit the hydraulic pressure to the wheel cylinders 42, thereby generating appropriate braking forces on the wheels. Thus, the behavior of the vehicle can be stabilized, and the driver can sense appropriate brake feeling.

In carrying out the present invention, the present invention is not limited to the above-mentioned embodiment and various modifications can be made thereto without departing from the object of the present invention.

For example, this embodiment is carried out in such a way that the brake ECU 100 acquires the accumulator pressure Pacc detected by the accumulator pressure sensor 101, the master cylinder pressure Pmc detected by the master cylinder pressure sensor 102, and the control pressure Px detected by the control pressure sensor 103, acquires the stroke Sm detected by the stroke sensor 104, and uses the accumulator pressure Pacc (control pressure Px), the master cylinder pressure Pmc, and the stroke Sm to determine a leak-occurring wheel cylinder system.

In this case, the brake ECU 100 can also be embodied so as to use only the accumulator pressure Pacc (control pressure Px) and the master cylinder pressure Pmc to determine a leak-occurring wheel cylinder system. In this case, an accuracy of determining a leak-occurring wheel cylinder system may decrease more or less compared with the embodiment described above, but a leak-occurring wheel cylinder system can be inexpensively determined by a more simplified configuration.

Moreover, in the above-mentioned embodiment, the present invention is carried out on the assumption that the hydraulic pressure booster 21 is a hydro booster which uses the servo pressure Ps (hydraulic pressure) supplied from the pressure increasing mechanism 80 configured to mechanically move. In this case, any pressure increasing mechanism can be employed as long as the pressure increasing mechanism is capable of introducing the servo pressure Ps into the neighborhood of the stroke adjustment spring 22d for coupling the first piston rod 22b and the second piston rod 22c of the master cylinder 22 to each other, thereby appropriately boosting (amplifying) the stepping force F input by the driver via the brake pedal 10.

Further, the embodiment is carried out so that the pressure increasing mechanism 80 supplies the hydraulic pressure booster 21 with the servo pressure Ps. In this case, for example, the present invention can be carried out such that the servo pressure Ps is supplied from the power hydraulic pressure generation device 30 to the hydraulic pressure booster. Also in this case, the driver can acquire appropriate brake operation feeling as in the embodiment.

The invention claimed is:

1. A vehicle brake device, comprising:
   a first wheel cylinder for receiving a hydraulic pressure of a working fluid and applying a braking force to a wheel, that is among a plurality of wheel cylinders of a vehicle;
   a master cylinder for introducing therein a servo pressure generated in response to an operation by a driver on a brake pedal thereby generating a hydraulic pressure;
   a power hydraulic pressure source for generating a hydraulic pressure by drive of a pressurizing pump;
   a linear control valve for adjusting the hydraulic pressure transmitted from the power hydraulic pressure source to the first wheel cylinder;
   first hydraulic pressure detection means for detecting the hydraulic pressure output from the power hydraulic pressure source;
   second hydraulic pressure detection means for detecting the hydraulic pressure output from the master cylinder;

third hydraulic pressure detection means for detecting the hydraulic pressure in the first wheel cylinder; and control means for controlling drive of the linear control valve based on the hydraulic pressure output from the master cylinder and detected by the second hydraulic pressure detection means, and the hydraulic pressure in the first wheel cylinder detected by the third hydraulic pressure detection means, wherein:

the control means is configured to:

shut off, when a magnitude of the hydraulic pressure output from the power hydraulic pressure source and detected by the first hydraulic pressure detection means has decreased to a value less than a predetermined value set in advance, communication between wheel cylinders provided for front right and left wheels among the plurality of wheel cylinders of the vehicle and wheel cylinders provided for rear right and left wheels among the plurality of wheel cylinders of the vehicle, switch the wheel cylinders provided for the front right and left wheels to a first communication state where the wheel cylinders provided for the front right and left wheels communicate to the master cylinder independently from each other, and switch the wheel cylinders provided for the rear right and left wheels to a second communication state where the wheel cylinders provided for the rear right and left wheels communicate via the linear control valve to the power hydraulic pressure source; and determine, based on a change in hydraulic pressure which continues to decrease without turning to increase and recovering after at least one of the first and second communication states is switched out of changes in hydraulic pressures detected by the first hydraulic pressure detection means, the second hydraulic pressure detection means, and the third hydraulic pressure detection means after the at least one of the first and second communication states is switched, in which brake system such a failure that the hydraulic pressure of the working fluid is unable to be transmitted occurs out of a brake system for the front right wheel for providing communication between the master cylinder and the wheel cylinder provided for the front right wheel, a brake system for the front left wheel for providing communication between the master cylinder and the wheel cylinder provided for the front left wheel, and brake systems for the rear right and left wheels for providing communication between the power hydraulic pressure source and the wheel cylinders provided for the rear right and left wheels;

the second hydraulic pressure detection means communicates to the brake system for the front right wheel or the brake system for the front left wheel; and the control means determines, after the at least one of the first and second communication states is switched, when at least the hydraulic pressures detected by the first hydraulic pressure detection means and the second hydraulic pressure detection means turn to increase and recover, that the failure occurs in a brake system not communicating to the second hydraulic pressure detection means out of the brake systems for the front right wheel and the front left wheel.

2. A vehicle brake device according to claim 1, wherein the control means is configured to:

maintain, when the control means determines that the failure occurs in the brake system not communicating to the second hydraulic pressure detection means out of the brake systems for the front right wheel and the front left wheel, communication between the master cylinder and a wheel cylinder among the plurality of wheel cylinders of the vehicle that is in a brake system communicating to the second hydraulic pressure detection means, and shut off communication between the master cylinder and a wheel cylinder among the plurality of wheel cylinders of the vehicle that is in the brake system not communicating to the second hydraulic pressure detection means; and maintain communication between the first wheel cylinder and the power hydraulic pressure source via the linear control valve in a brake system on a diagonal position side with respect to the brake system communicating to the second hydraulic pressure detection means out of the brake systems for the rear right and left wheels, and shut off communication between a second wheel cylinder among the plurality of wheel cylinders of the vehicle and the power hydraulic pressure source via the linear control valve in a brake system on a diagonal position side with respect to the brake system not communicating to the second hydraulic pressure detection means.

3. A vehicle brake device according to claim 1, wherein the control means determines, after the at least one of the first and second communication states is switched, when at least the hydraulic pressure detected by the first hydraulic pressure detection means turns to increase and recovers while the hydraulic pressure detected by the second hydraulic pressure detection means continues to decrease without turning to increase and recovering, that the failure occurs in a brake system communicating to the second hydraulic pressure detection means out of the brake systems for the front right and left wheels.

4. A vehicle brake device according to claim 3, wherein the control means is configured to:

maintain, when the control means determines that the failure occurs in the brake system communicating to the second hydraulic pressure detection means out of the brake systems for the front right wheel and the front left wheel, communication between the master cylinder and a wheel cylinder among the plurality of wheel cylinders of the vehicle that is in the brake system not communicating to the second hydraulic pressure detection means, and shut off communication between the master cylinder and a wheel cylinder among the plurality of wheel cylinders of the vehicle that is in the brake system communicating to the second hydraulic pressure detection means; and maintain communication between the first wheel cylinder and the power hydraulic pressure source via the linear control valve in a brake system on a diagonal position with respect to the brake system not communicating to the second hydraulic pressure detection means out of the brake systems for the rear right and left wheels, and shut off communication between a second wheel cylinder among the plurality of wheel cylinders of the vehicle and the power hydraulic pressure source via the linear control valve in a brake system on a diagonal position side with respect to the brake system not communicating to the second hydraulic pressure detection means.

5. A vehicle brake device according to claim 1, wherein the control means determines, after the at least one of the first and second communication states is switched, when at least the hydraulic pressure detected by the first hydraulic pressure detection means continues to decrease without turning to increase and recovering while the hydraulic pressure detected by the second hydraulic pressure detection means turns to increase and recovers, that the failure occurs in the brake systems for the rear right and left wheels.

6. A vehicle brake device according to claim 5, wherein the control means is configured to
shut off, when the control means determines that the failure occurs in the brake systems for the rear right and left wheels, communication between the power hydraulic pressure source and the wheel cylinders provided for the rear right and left wheels; and
maintain communication between the master cylinder and the wheel cylinder provided for the front right wheel, and communication between the master cylinder and the wheel cylinder provided for the front left wheel.

7. A vehicle brake device according to claim 1, further comprising stroke detection means for detecting a stroke input to the master cylinder in response to the operation by the driver on the brake pedal,
wherein the control means determines, based on the change in hydraulic pressure which continues to decrease without turning to increase and recovering after the at least one of the first and second communication states is switched out of the changes in hydraulic pressures detected by the first hydraulic pressure detection means, the second hydraulic pressure detection means, and the third hydraulic pressure detection means after the at least one of the first and second communication states is switched, and a change in stroke detected by the stroke detection means, in which brake system the failure occurs out of the brake system for the front right wheel, the brake system for the front left wheel, and the brake systems for the rear right and left wheels.

8. A vehicle brake device according to claim 7, wherein the control means determines, after the at least one of the first and second communication states is switched, when the change in stroke detected by the stroke detection means is a change which continues to increase to a mechanically restricted stroke, that the failure occurs in at least one of the brake system for the front right wheel or the brake system for the front left wheel.

9. A vehicle brake device according to claim 7, wherein the control means determines, after the at least one of the first and second communication states is switched, when the stroke detected by the stroke detection means is maintained constant, that the failure occurs in the brake systems for the rear right and left wheels.

10. A vehicle brake device according to claim 1, wherein the servo pressure to be introduced into the master cylinder is supplied from a pressure increasing mechanism, the pressure increasing mechanism being configured to mechanically move by the hydraulic pressure output from the master cylinder in response to the operation by the driver on the brake pedal, to thereby generate a hydraulic pressure having a predetermined ratio with respect to the hydraulic pressure output from the master cylinder.

11. A vehicle brake device according to claim 10, wherein:
in the master cylinder, a piston rod for coupling a pressurizing piston for pressurizing the stored working fluid and the brake pedal to each other is divided;
the piston rod comprises:
a first piston rod connected to the brake pedal at one end;
a second piston rod connected to the pressurizing piston at one end; and
an elastic body for coupling another end of the first piston rod and another end of the second piston rod to each other, and adjusting a stroke caused by the operation by the driver on the brake pedal; and
the servo pressure is introduced from the pressure increasing mechanism to at least the pressurizing piston and the another end of the first piston rod.

12. A vehicle brake device, comprising:
a first wheel cylinder to receive a hydraulic pressure of a working fluid and to apply a braking force to a wheel, that is among a plurality of wheel cylinders of a vehicle;
a master cylinder to introduce therein a servo pressure generated in response to an operation by a driver on a brake pedal, thereby generating a hydraulic pressure;
a power hydraulic pressure source to generate a hydraulic pressure by drive of a pressurizing pump;
a linear control valve to adjust the hydraulic pressure transmitted from the power hydraulic pressure source to the first wheel cylinder;
a first hydraulic pressure sensor to detect the hydraulic pressure output from the power hydraulic pressure source;
a second hydraulic pressure sensor to detect the hydraulic pressure output from the master cylinder;
a third hydraulic pressure sensor to detect the hydraulic pressure in the first wheel cylinder; and
circuitry configured to control drive of the linear control valve based on the hydraulic pressure output from the master cylinder and detected by the second hydraulic pressure sensor, and the hydraulic pressure in the first wheel cylinder detected by the third hydraulic pressure sensor, wherein:
the circuitry is configured to:
shut off, when a magnitude of the hydraulic pressure output from the power hydraulic pressure source and detected by the first hydraulic pressure sensor has decreased to a value less than a predetermined value set in advance, communication between wheel cylinders provided for front right and left wheels among the plurality of wheel cylinders of the vehicle and wheel cylinders provided for rear right and left wheels among the plurality of wheel cylinders of the vehicle, switch the wheel cylinders provided for the front right and left wheels to a first communication state where the wheel cylinders provided for the front right and left wheels communicate to the master cylinder independently from each other, and switch the wheel cylinders provided for the rear right and left wheels to a second communication state where the wheel cylinders provided for the rear right and left wheels communicate via the linear control valve to the power hydraulic pressure source; and
determine, based on a change in hydraulic pressure which continues to decrease without turning to increase and recovering after at least one of the first and second communication states is switched out of changes in hydraulic pressures detected by the first hydraulic pressure sensor, the second hydraulic pressure sensor, and the third hydraulic pressure sensor after the at least one of the first and second communication states is switched, in which brake system such a failure that the hydraulic pressure of the working fluid is unable to be transmitted occurs out of a brake system for the front right wheel to provide communication between the master cylinder and the wheel cylinder provided for the front right wheel, a brake system for the front left wheel to provide communication between the master cylinder and the wheel cylinder provided for the front left wheel, and brake systems for the rear right and left wheels to provide communication between the power hydraulic pressure source and the wheel cylinders provided for the rear right and left wheels;

the second hydraulic pressure sensor communicates to the brake system for the front right wheel or the brake system for the front left wheel; and the circuitry is configured to determine, after the at least one of the first and second communication states is switched, when at least the hydraulic pressures detected by the first hydraulic pressure sensor and the second hydraulic pressure sensor turn to increase and recover, that the failure occurs in a brake system not communicating to the second hydraulic pressure sensor out of the brake systems for the front right wheel and the front left wheel.

13. A vehicle brake device according to claim 12, wherein the circuitry is configured to:

maintain, when the circuitry determines that the failure occurs in the brake system not communicating to the second hydraulic pressure sensor out of the brake systems for the front right wheel and the front left wheel, communication between the master cylinder and a wheel cylinder among the plurality of wheel cylinders of the vehicle that is in a brake system communicating to the second hydraulic pressure sensor, and shut off communication between the master cylinder and a wheel cylinder among the plurality of wheel cylinders of the vehicle that is in the brake system not communicating to the second hydraulic pressure sensor; and maintain communication between the first wheel cylinder and the power hydraulic pressure source via the linear control valve in a brake system on a diagonal position side with respect to the brake system communicating to the second hydraulic pressure sensor out of the brake systems for the rear right and left wheels, and shut off communication between a second wheel cylinder among the plurality of wheel cylinders of the vehicle and the power hydraulic pressure source via the linear control valve in a brake system on a diagonal position side with respect to the brake system not communicating to the second hydraulic pressure sensor.

14. A vehicle brake device according to claim 12, wherein the circuitry is configured to determine, after the at least one of the first and second communication states is switched, when at least the hydraulic pressure detected by the first hydraulic pressure sensor turns to increase and recovers while the hydraulic pressure detected by the second hydraulic pressure sensor continues to decrease without turning to increase and recovering, that the failure occurs in a brake system communicating to the second hydraulic pressure sensor out of the brake systems for the front right and left wheels.

15. A vehicle brake device according to claim 14, wherein the circuitry is configured to:

maintain, when the circuitry determines that the failure occurs in the brake system communicating to the second hydraulic pressure sensor out of the brake systems for the front right wheel and the front left wheel, communication between the master cylinder and a wheel cylinder among the plurality of wheel cylinders of the vehicle that is in the brake system not communicating to the second hydraulic pressure sensor, and shut off communication between the master cylinder and a wheel cylinder among the plurality of wheel cylinders of the vehicle that is in the brake system communicating to the second hydraulic pressure sensor; and maintain communication between the first wheel cylinder and the power hydraulic pressure source via the linear control valve in a brake system on a diagonal position with respect to the brake system not communicating to the second hydraulic pressure sensor out of the brake systems for the rear right and left wheels, and shut off communication between a second wheel cylinder among the plurality of wheel cylinders of the vehicle and the power hydraulic pressure source via the linear control valve in a brake system on a diagonal position side with respect to the brake system not communicating to the second hydraulic pressure sensor.

16. A vehicle brake device according to claim 12, wherein the circuitry is configured to determine, after the at least one of the first and second communication states is switched, when at least the hydraulic pressure detected by the first hydraulic pressure sensor continues to decrease without turning to increase and recovering while the hydraulic pressure detected by the second hydraulic pressure sensor turns to increase and recovers, that the failure occurs in the brake systems for the rear right and left wheels.

17. A vehicle brake device according to claim 16, wherein the circuitry is configured to:

shut off, when the circuitry determines that the failure occurs in the brake systems for the rear right and left wheels, communication between the power hydraulic pressure source and the wheel cylinders provided for the rear right and left wheels; and maintain communication between the master cylinder and the wheel cylinder provided for the front right wheel, and communication between the master cylinder and the wheel cylinder provided for the front left wheel.

18. A vehicle brake device according to claim 12, further comprising stroke detection sensor to detect a stroke input to the master cylinder in response to the operation by the driver on the brake pedal, wherein the circuitry is configured to determine, based on the change in hydraulic pressure which continues to decrease without turning to increase and recovering after the at least one of the first and second communication states is switched out of the changes in hydraulic pressures detected by the first hydraulic pressure sensor, the second hydraulic pressure sensor, and the third hydraulic pressure sensor after the at least one of the first and second communication states is switched, and a change in stroke detected by the stroke detection sensor, in which brake system the failure occurs out of the brake system for the front right wheel, the brake system for the front left wheel, and the brake systems for the rear right and left wheels.

19. A vehicle brake device according to claim 18, wherein the circuitry is configured to determine, after the at least one of the first and second communication states is switched, when the change in stroke detected by the stroke detection sensor is a change which continues to increase to a mechanically restricted stroke, that the failure occurs in at least one of the brake system for the front right wheel or the brake system for the front left wheel.

20. A vehicle brake device according to claim 18, wherein the circuitry is configured to determine, after the at least one of the first and second communication states is switched, when the stroke detected by the stroke detection sensor is maintained constant, that the failure occurs in the brake systems for the rear right and left wheels.

21. A vehicle brake device according to claim 12, wherein the servo pressure to be introduced into the master cylinder is supplied from a pressure increasing mechanism, the pressure increasing mechanism being configured to mechanically move by the hydraulic pressure output from the master cylinder in response to the operation by the driver on the brake pedal, to thereby generate a hydraulic pressure having a predetermined ratio with respect to the hydraulic pressure output from the master cylinder.

22. A vehicle brake device according to claim 21, wherein:
- in the master cylinder, a piston rod to couple a pressurizing piston to pressurize the stored working fluid and the brake pedal to each other is divided;
- the piston rod comprises:
  - a first piston rod connected to the brake pedal at one end;
  - a second piston rod connected to the pressurizing piston at one end; and
  - an elastic body to couple another end of the first piston rod and another end of the second piston rod to each other, and adjusting a stroke caused by the operation by the driver on the brake pedal; and
- the servo pressure is introduced from the pressure increasing mechanism to at least the pressurizing piston and the another end of the first piston rod.

\* \* \* \* \*